(12) United States Patent
Ikegami et al.

(10) Patent No.: US 8,130,396 B2
(45) Date of Patent: Mar. 6, 2012

(54) IMAGE FORMATION MANAGEMENT SYSTEM, IMAGE FORMATION MANAGEMENT METHOD, AND STORAGE MEDIUM

(75) Inventors: Munemitsu Ikegami, Tokyo (JP); Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1174 days.

(21) Appl. No.: 11/905,798

(22) Filed: Oct. 4, 2007

(65) Prior Publication Data
US 2008/0094657 A1 Apr. 24, 2008

(30) Foreign Application Priority Data

Oct. 5, 2006 (JP) .................................. 2006-273608
Dec. 6, 2006 (JP) .................................. 2006-329079

(51) Int. Cl.
*G06F 3/12* (2006.01)
(52) U.S. Cl. ....................... 358/1.15; 358/1.1
(58) Field of Classification Search ................... 358/1.1, 358/1.15, 1.14, 1.9
See application file for complete search history.

(56) References Cited

U.S. PATENT DOCUMENTS

| | | | |
|---|---|---|---|
| 6,674,545 B1 | 1/2004 | Atsumi | |
| 2002/0048036 A1 | 4/2002 | Nakagawa et al. | |
| 2006/0136992 A1 | 6/2006 | Shigeeda | |

FOREIGN PATENT DOCUMENTS

| | | |
|---|---|---|
| JP | 09-185474 | 7/1997 |
| JP | 11-015335 | 1/1999 |
| JP | 2002-297327 | 10/2002 |
| JP | 2004-102356 | 4/2004 |
| JP | 2005-063146 | 3/2005 |
| JP | 2005-271317 | 10/2005 |
| JP | 2006-203858 | 8/2006 |
| JP | 2006-209402 | 8/2006 |

OTHER PUBLICATIONS

Office Action for corresponding Japanese patent application No. 2007-148966 dated Oct. 11, 2011.

*Primary Examiner* — King Poon
*Assistant Examiner* — Iriana Cruz
(74) *Attorney, Agent, or Firm* — Harness, Dickey & Pierce, P.L.C.

(57) ABSTRACT

A disclosed image formation management system includes image forming apparatuses and a local management apparatus connected via a network to the image forming apparatuses. Each of the image forming apparatuses includes a user information storing unit storing user information of users, a management information storing unit storing a current number of image formation pages and a maximum number of image formation pages of each of the users, and an image formation control unit configured to authenticate the users based on the user information and to limit image formation by each of the authenticated users based on the current number of image formation pages and the maximum number of image formation pages. The local management apparatus is configured to manage the user information and the maximum numbers of image formation pages of the users of the image forming apparatuses.

9 Claims, 25 Drawing Sheets

FIG.3

| USER NO. | CARD USER ID | LOGIN USER NAME | LOGIN PASSWORD | CURRENT NO. OF PRINTED PAGES | MAXIMUM NO. OF PRINTABLE PAGES |
|---|---|---|---|---|---|
| 1 | 034555 | Ua | ny32_p | 300 | 1100 |
| 2 | 034512 | Ub | # kip | 240 | 1090 |
|  |  |  |  |  |  |

FIG.4

| USER NO. | CARD USER ID | LOGIN USER NAME | LOGIN PASSWORD | CURRENT NO. OF PRINTED PAGES | MAXIMUM NO. OF PRINTABLE PAGES |
|---|---|---|---|---|---|
| 1 | 034555 | Ua | ny32_p | 250 | 1050 |
| 2 | 034512 | Ub | # kip | 320 | 1170 |
|  |  |  |  |  |  |

FIG.5

| USER NO. | CARD USER ID | LOGIN USER NAME | LOGIN PASSWORD | CURRENT SUB-TOTAL NO. OF PRINTED PAGES | SUB-TOTAL MAXIMUM NO. OF PRINTABLE PAGES |
|---|---|---|---|---|---|
| 1 | 0345555 | Ua | ny32_p | 550 | 1350 |
| 2 | 034512 | Ub | # kip | 560 | 1350 |
| 3 | 034501 | Uc | 32zro | 0 | 1350 |
| 4 | 034504 | Ud | 12# 52 | 0 | 1350 |
| ... | ... | ... | ... | | |

FIG.6

| USER NO. | CARD USER ID | LOGIN USER NAME | LOGIN PASSWORD | CURRENT SUB-TOTAL NO. OF PRINTED PAGES | SUB-TOTAL MAXIMUM NO. OF PRINTABLE PAGES |
|---|---|---|---|---|---|
| 1 | 034555 | Ua | ny32_p | 550 | 1350 |
| 2 | 034512 | Ub | # kip | 560 | 1410 |
| 3 | 034501 | Uc | 32zro | 0 | 1446 |
| 4 | 034504 | Ud | 12# 52 | 0 | 1427 |
| ... | ... | ... | ... | | |

FIG.7

| USER NO. | CARD USER ID | LOGIN USER NAME | LOGIN PASSWORD | CURRENT SUB-TOTAL NO. OF PRINTED PAGES | SUB-TOTAL MAXIMUM NO. OF PRINTABLE PAGES |
|---|---|---|---|---|---|
| 1 | 034555 | Ua | ny32_p | 150 | 950 |
| 2 | 034512 | Ub | # kip | 90 | 940 |
| 3 | 034501 | Uc | 32zro | 54 | 1446 |
| 4 | 034504 | Ud | 12# 52 | 73 | 1427 |
| ... | ... | ... | ... | | |

FIG.8

| USER NO. | CARD USER ID | LOGIN USER NAME | LOGIN PASSWORD | CURRENT TOTAL NO. OF PRINTED PAGES | TOTAL MAXIMUM NO. OF PRINTABLE PAGES |
|---|---|---|---|---|---|
| 1 | 034555 | Ua | ny32_p | 700 | 1500 |
| 2 | 034512 | Ub | # kip | 650 | 1500 |
| 3 | 034501 | Uc | 32zro | 54 | 1500 |
| 4 | 034504 | Ud | 12# 52 | 73 | 1500 |
| ... | ... | ... | ... | | |

FIG.13

| USER NO. | CARD USER ID | LOGIN USER NAME | LOGIN PASSWORD | CURRENT NO. OF PRINTED PAGES | PRINT PERMISSION FLAG |
|---|---|---|---|---|---|
| 1 | 0345555 | Ua | ny32_p | 300 | TRUE |
| 2 | 0345512 | Ub | # kip | 240 | TRUE |
| | | | | | |

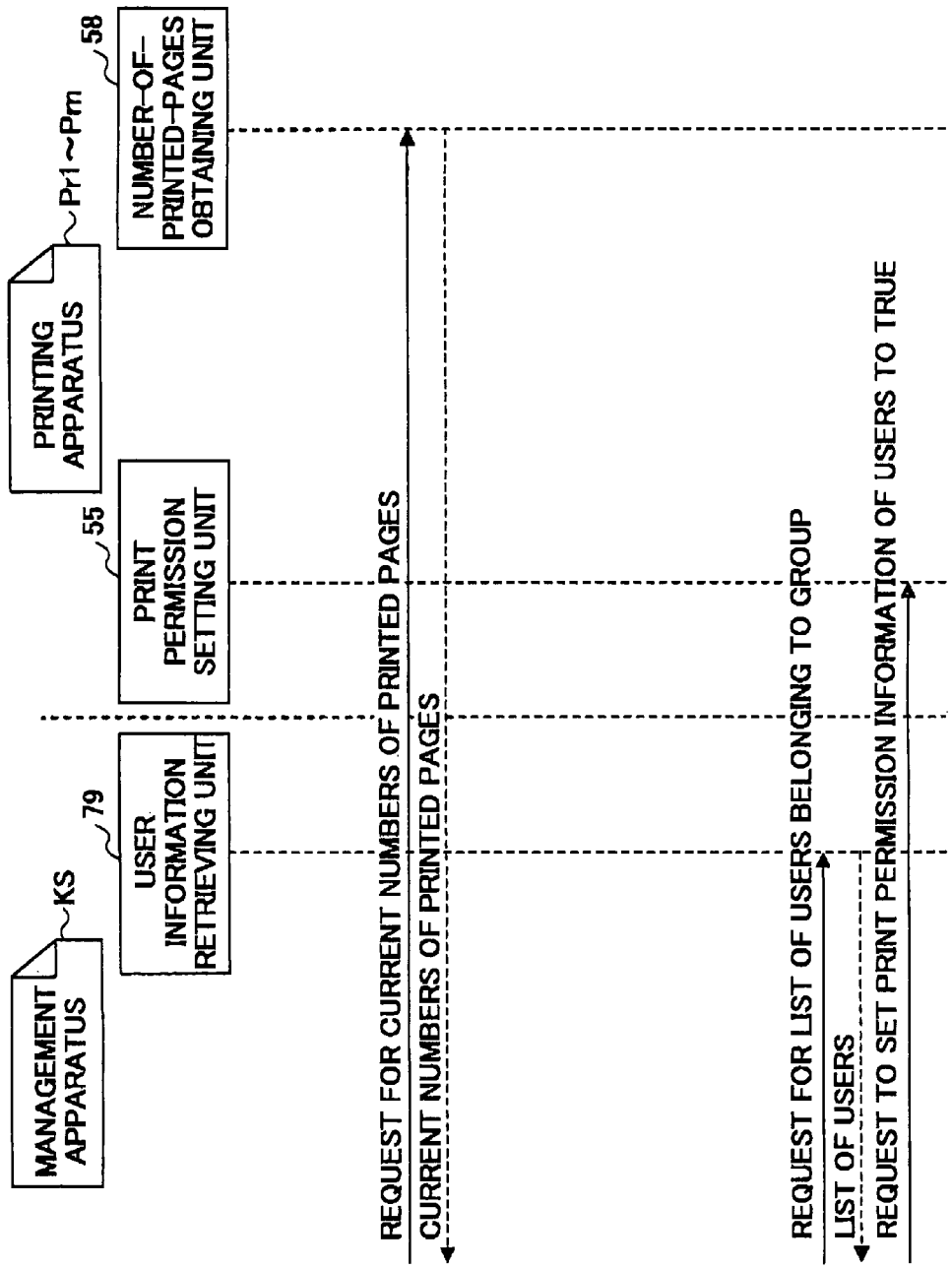

IMAGE FORMATION MANAGEMENT SYSTEM, IMAGE FORMATION MANAGEMENT METHOD, AND STORAGE MEDIUM

BACKGROUND OF THE INVENTION

1. Field of the Invention

The present invention generally relates to an image formation management system, an image formation management method, and a storage medium containing an image formation management program. More particularly, this invention relates to an image formation management system, an image formation management method, and a storage medium containing an image formation management program that authorize image formation requests and limit the number of printable pages.

2. Description of the Related Art

Some image forming apparatuses, such as facsimile machines, copiers, multifunction copiers, and printers, include a mechanism to limit the number of printable pages and thereby to save paper.

Meanwhile, in recent years, the total cost of ownership (TCO) of image forming apparatuses has become an important factor in business management. In such a trend, limiting the number of printable pages for each image forming apparatus is not effective enough to reduce paper consumption and printing costs.

The present applicant has previously proposed a network printing system that improves the TCO of image forming apparatuses. The proposed network printing system includes a client terminal, a printer, a print management server for limiting the number of pages a user can print, and an authentication server that are connected via a network to each other (see patent document 1). The authentication server stores authentication information, the number of printed pages, and the maximum number of printable pages for each user and is configured to authenticate a user of the client terminal. When an authenticated user enters a print job from the client terminal, the print management server obtains the authentication information, the number of printed pages, and the maximum number of printable pages of the user via the network from the authentication server, and determines whether to permit the execution of the print job based on the obtained information. After permitting the execution of the print job, the print management server updates the number of printed pages each time a predetermined number of pages are printed, and sends the updated number of printed pages back to the authentication server.

Also, patent document 2 discloses an image forming system including an image forming apparatus and a management apparatus that are connected via a network. The management apparatus monitors use of the image forming apparatus by groups of users and determines whether to permit a user group to use the image forming apparatus based on the monitored results.

[Patent document 1] Japanese Patent Application Publication No. 2004-102356

[Patent document 2] Japanese Patent Application Publication No. 2005-271317

One disadvantage of the network printing system disclosed in patent document 1 is that the print management server has to access the authentication server via the network, each time when a user tries to use the printer from the client terminal, to obtain the authentication information, the number of printed pages, and the maximum number of printable pages. This in turn reduces the response speed of the network printing system. Also, in the disclosed network printing system, the print management server accesses the authentication server each time a print job is entered and each time a predetermined number of pages are printed to determine whether to permit the execution or continuation of a print job. However, in some cases, such a strict control may not be required.

One disadvantage of the image forming system disclosed in patent document 2 is that since the system limits the use of the image forming apparatus by user groups, it is not possible to prevent one particular user from printing a large number of documents and therefore it is difficult to effectively limit the use of the image forming apparatus.

SUMMARY OF THE INVENTION

Embodiments of the present invention provide an image formation management system, an image formation management method, and a storage medium containing an image formation management program that solve or reduce one or more problems caused by the limitations and disadvantages of the related art.

An embodiment of the present invention provides an image formation management system including image forming apparatuses for forming images according to image formation jobs and a local management apparatus connected via a network to the image forming apparatuses and configured to manage the use of the image forming apparatuses. Each of the image forming apparatuses includes a user information storing unit configured to store user information of users, a management information storing unit configured to store a current number of image formation pages and a maximum number of image formation pages of each of the users, and an image formation control unit configured to authenticate the users based on the user information and to limit image formation by each of the authenticated users based on the current number of image formation pages and the maximum number of image formation pages. The local management apparatus includes a local user information storing unit configured to store the user information of the image forming apparatuses, the user information being associated with the image forming apparatuses, a local management information storing unit configured to store a current sub-total number of image formation pages and a sub-total maximum number of image formation pages of each of the users, which current sub-total number of image formation pages is the sum of the current numbers of image formation pages of the each of the users obtained from the image forming apparatuses, and a local information management unit configured to provide the user information to the image forming apparatuses, to obtain the current numbers of image formation pages from the image forming apparatuses at predetermined timings, to calculate the current sub-total number of image formation pages from the obtained current numbers of image formation pages for each of the users, to calculate the maximum number of image formation pages for the each of the users from the current sub-total number of image formation pages and the sub-total maximum number of image formation pages, and to send the calculated maximum number of image formation pages to a corresponding one of the image forming apparatuses. The image formation control unit of each of the image forming apparatuses is configured to store the maximum number of image formation pages sent from the local information management unit of the local management apparatus in the management information storing unit.

Another embodiment of the present invention provides a storage medium having program code stored therein used for image formation management in an image formation management system including image forming apparatuses and a local management apparatus connected via a network to the image forming apparatuses. The program code includes a user information providing code unit configured to cause the local management apparatus to provide user information of users allowed to use the image forming apparatuses to the image forming apparatuses; a management information setting code unit configured to cause the local management apparatus to set maximum numbers of image formation pages of the users in the image forming apparatuses; an image formation management code unit configured to cause each of the image forming apparatuses to authenticate the users based on the user information, and to limit image formation by the authenticated users based on current numbers of image formation pages and the maximum numbers of image formation pages of the users; and a local information management code unit configured to cause the local management apparatus to obtain the current numbers of image formation pages of the users from the image forming apparatuses at predetermined timings, to calculate current sub-total numbers of image formation pages of the users by adding up the obtained current numbers of image formation pages user by user, to calculate the maximum numbers of image formation pages for the users from the current sub-total numbers of image formation pages and sub-total maximum numbers of image formation pages assigned to the users, and to send the calculated maximum numbers of image formation pages to the image forming apparatuses.

Still another embodiment of the present invention provides an image formation management system including image forming apparatuses for forming images according to image formation jobs and a management apparatus connected via a network to the image forming apparatuses and configured to manage the use of the image forming apparatuses. Each of the image forming apparatuses includes a number-of-image-formation-pages storing unit configured to store current numbers of image formation pages of users of the each of the image forming apparatuses, an image formation permission information storing unit configured to store image formation permission information of the users, and an image formation control unit configured to determine whether to allow the users to perform image formation based on the image formation permission information, to count numbers of image formation pages of the allowed users, and to update the current numbers of image formation pages in the number-of-image-formation-pages storing unit based on the counted numbers of image formation pages. The management apparatus includes a management information storing unit configured to store a total maximum number of image formation pages for each of groups to which the users belong, and a permission control unit configured to obtain the current numbers of image formation pages of the users belonging to the each of the groups from the image forming apparatuses at predetermined timings, to calculate a total number of image formation pages of the each of the groups by adding up the current numbers of image formation pages, to determine whether the total number of image formation pages is equal to or larger than the total maximum number of image formation pages, and to request the image forming apparatuses to set the image formation permission information of the users belonging to the each of the groups to false if the total number of image formation pages is equal to or larger than the total maximum number of image formation pages. The image formation control unit of each of the image forming apparatuses is configured to set the image formation permission information of the corresponding users in the image formation permission information storing unit to false when requested by the permission control unit.

BRIEF DESCRIPTION OF THE DRAWINGS

FIG. 3 shows an exemplary authentication information table of a printing apparatus Pa1 of FIG. 2;

FIG. 4 shows an exemplary authentication information table of a printing apparatus Pa2 of FIG. 2;

FIG. 5 shows an exemplary authentication information table of a local management server RSa of FIG. 2;

FIG. 6 shows an exemplary authentication information table of a local management server RSb of FIG. 1;

FIG. 7 shows an exemplary authentication information table of a local management server RSc of FIG. 1;

FIG. 8 shows an exemplary authentication information table of a central management server of FIG. 1;

FIG. 13 shows an exemplary authentication information table of a printing apparatus in a printing system implemented by an image formation management system, an image formation management method, and a storage medium containing an image formation management program of a second embodiment of the present invention;

FIG. 26 is a sequence chart showing remaining steps of the exemplary number-of-printed-pages resetting process shown in FIG. 25.

DESCRIPTION OF THE PREFERRED EMBODIMENTS

Preferred embodiments of the present invention are described below with reference to the accompanying drawings.

First Embodiment

Figure 1:
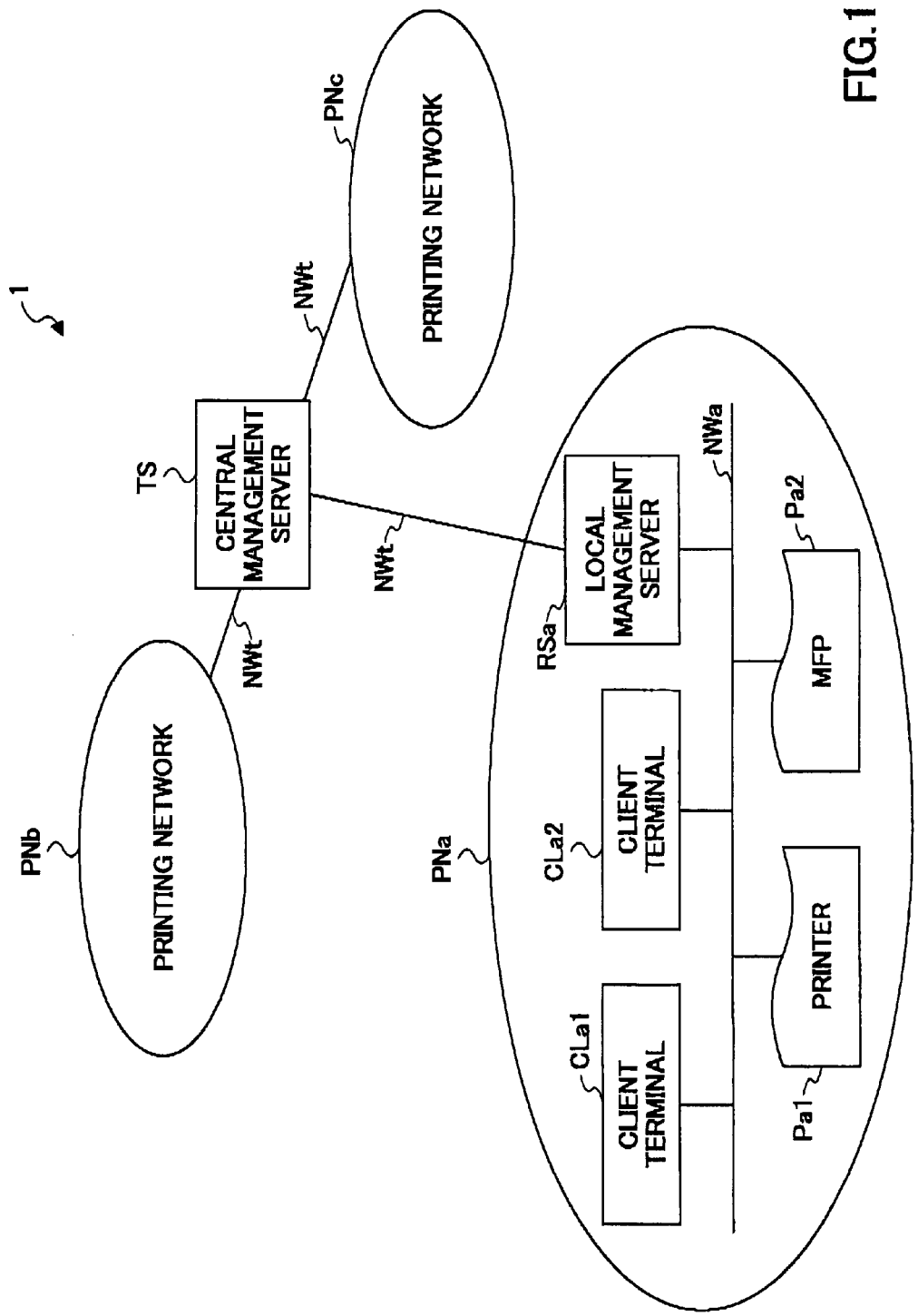
FIG. 1 is a drawing illustrating an exemplary configuration of a printing system implemented by an image formation management system, an image formation management method, and a storage medium containing an image formation management program of a first embodiment of the present invention.

An image formation management system, an image formation management method, and a storage medium containing an image formation management program according to a first embodiment of the present invention are described below with reference to FIGS. 1 through 11. FIG. 1 is a drawing illustrating an exemplary configuration of a printing system 1 implemented by an image formation management system, an image formation management method, and a storage medium containing an image formation management program of the first embodiment.

In the printing system 1 shown in FIG. 1, multiple printing networks (in this example, three printing networks PNa, PNb, and PNc) are connected via a network NWt to a central management server (central management apparatus) TS. The printing network PNa includes multiple client terminals (in this example, two client terminals CLa1 and CLa2), multiple printing apparatuses (image forming apparatuses; in this example, two printing apparatuses Pa1 and Pa2), and a local management server (management apparatus) RSa that are connected to each other via a network NWa such as a local area network (LAN). Each of the printing networks PNb and PNc has substantially the same configuration as that of the printing network PNa. In the descriptions below, components of the printing networks PNb and PNc are referred to by using the corresponding symbols (for example, local management servers RSb and RSc). The numbers of client terminals and printing apparatuses are not limited to those shown in FIG. 1.

An exemplary configuration of the printing network PNa is described below in more detail. The descriptions may also apply to the printing networks PNb and PNc.

The client terminals CLa1 and CLa2 are, for example, implemented by personal computers. Users create documents and enter print requests for printing those documents by using the client terminals CLa1 and CLa2. The client terminals CLa1 and CLa2 send print jobs corresponding to the print requests to the printing apparatuses Pa1 and Pa2 via the network NWa. When sending print jobs to the printing apparatuses Pa1 and Pa2, the client terminals CLa1 and CLa2 attach authentication information (e.g. a combination of a user name and a password, or a user ID) of the corresponding users to the print jobs.

Figure 2:
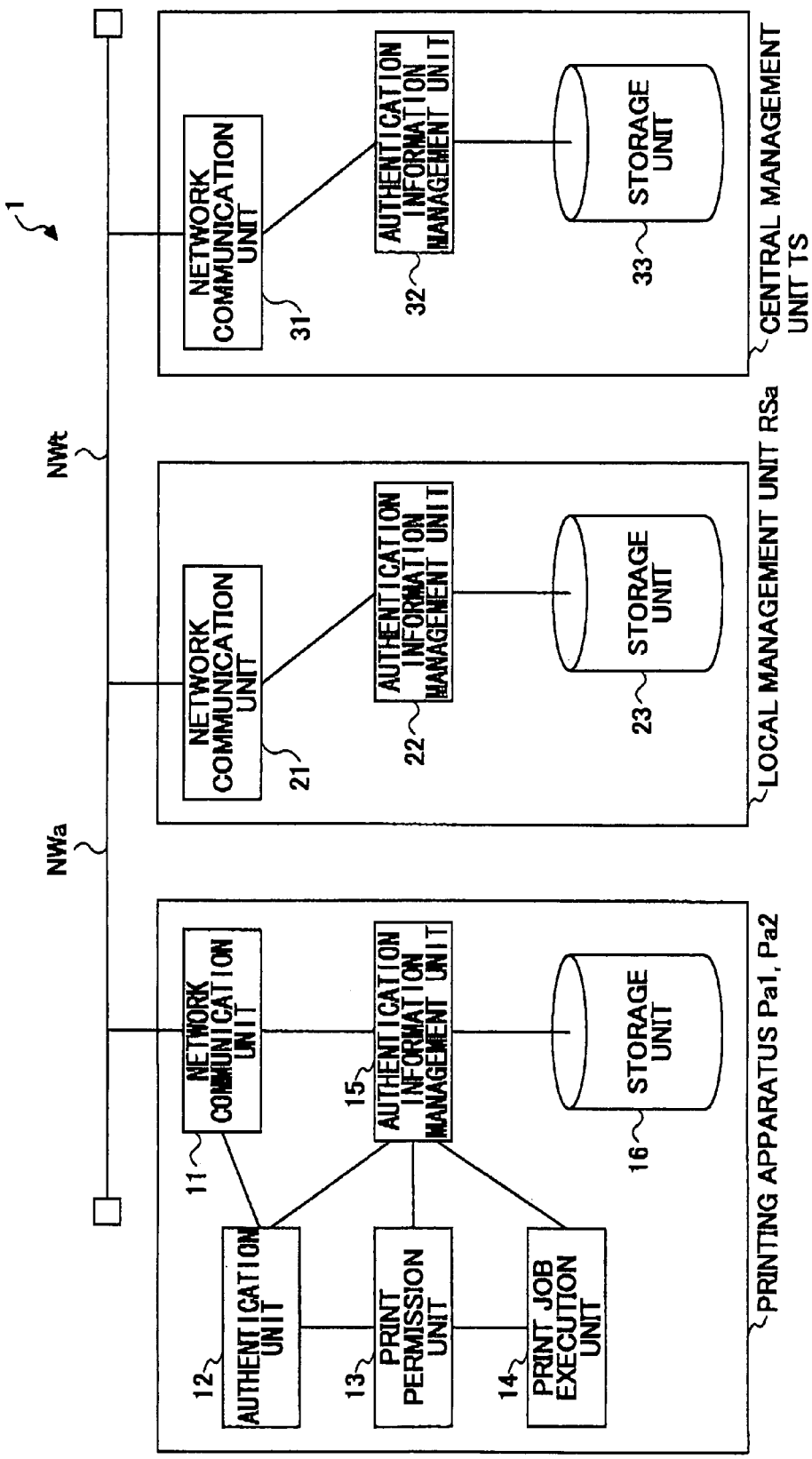
FIG. 2 is a block diagram illustrating exemplary functional configurations of a printing apparatus, a local management server, and a central management server.

Examples of the printing apparatuses Pa1 and Pa2 include, as shown in FIG. 1, a printer and a multifunction printer (MFP). Each of the printing apparatuses Pa1 and Pa2 may include a control unit, a paper-feed unit, a printing unit (image forming unit), a paper ejecting unit, and a console display. Also, as shown in FIG. 2, each of the printing apparatuses Pa1 and Pa2 includes a network communication unit 11, an authentication unit 12, a print permission unit 13, a print job execution unit 14, an authentication information management unit 15, and a storage unit 16. In the present application, the authentication unit 12, the print permission unit 13, and the authentication information management unit 15 correspond to an image formation control unit, and the storage unit 16 corresponds to a user information storing unit and a management information storing unit.

The network communication unit 11 is connected to the network NWa and sends and receives information, such as print jobs and authentication information, to and from the client terminals CLa1 and CLa2 and the local management server RSa via the network NWa.

The storage unit 16 stores an authentication information table containing authentication and management information of users of the printing apparatus Pa1 (or Pa2). The authentication information management unit 15 registers, updates, and deletes the authentication and management information in the authentication information table, and provides the authentication and management information to the authentication unit 12 and the print permission unit 13. Also, the authentication information management unit 15 sends and receives information such as the number of printed pages to and from the print job execution unit 14.

The authentication information table contains authentication information (user information) for identifying users of the printing apparatus Pa1 (or Pa2) and management information used to limit printing. For example, as shown in FIGS. 3 and 4, an authentication information table contains, for each user, authentication information including a card user ID, a login user name, and a login password, and management information including a current number of printed pages and a maximum number of printable pages. FIG. 3 shows exemplary authentication and management information contained in the authentication information table stored in the storage unit 16 of the printing apparatus Pa1. FIG. 4 shows exemplary authentication and management information contained in the authentication information table stored in the storage unit 16 of the printing apparatus Pa2.

When a print job is sent from the client terminal CLa1 (or Cla2) and received by the network communication unit 11, the authentication unit 12 determines whether the user requesting the print job is an authorized user based on authentication information attached to the print job and authentication information in the authentication information table. If the user is an authorized user, the authentication unit 12 sends the authentication result to the print permission unit 13.

The print permission unit 13 receives management information of the user from the authentication information management unit 15, determines, based on the management information, whether the current number of printed pages of the user is smaller than the maximum number of printable pages for the user, and thereby determines whether to permit the execution of the print job. The print permission unit 13 sends the result, to the print job execution unit 14.

If the execution of the print job is permitted by the print permission unit 13, the print job execution unit 14 executes the print job and reports the number of pages printed in the print job to the authentication information management unit 15.

The local management server RSa is, for example, implemented by a computer and includes hardware components that are normally necessary for a server. Also, as shown in FIG. 2, the local management server RSa includes a network communication unit 21, an authentication information management unit 22, and a storage unit 23. In the present application, the authentication information management unit 22 corresponds to a local information management unit, and the storage unit 23 corresponds to a local user information storing unit and a local management information storing unit.

The network communication unit 21 communicates with the client terminals CLa1 and CLa2 via the network NWa; sends and receives authentication and management information to and from the printing apparatuses Pa1 and Pa2 via the network NWa; and sends and receives authentication and management information to and from the central management server TS via the network NWt.

The authentication information management unit 22 registers authentication and management information of users of the printing apparatuses Pa1 and Pa2 connected to the network NWa in an authentication information table in the storage unit 23, and thereby manages the authentication and management information. More specifically, the authentication information management unit 22 registers, updates, and deletes the authentication and management information in the authentication information table, and provides the authentication and management information to the printing apparatuses Pa1 and Pa2. Also, the authentication information management unit 22 sends and receives authentication and management information to and from the central management server TS via the network communication unit 21.

The storage unit 23 stores the authentication information table containing the authentication and management information of users of the printing apparatuses Pa1 and Pa2 in the printing network PNa. For example, as shown in FIG. 5, an authentication information table contains authentication information including a card user ID, a login user name, and a login password, and management information including a current sub-total number of printed pages and a sub-total maximum number of printable pages (sub-total maximum number of image formation pages) for each user of the printing apparatuses Pa1 and Pa2 in the printing network PNa. The above descriptions are applicable to the local management servers RSb and RSc in the printing networks PNb and PNc. FIG. 5 shows an exemplary authentication information table of the local management server RSa in the printing network PNa. FIG. 6 shows an exemplary authentication information table of the local management server RSb in the printing network PNb. FIG. 7 shows an exemplary authentication information table of the local management server. RSc in the printing network PNc.

The central management server TS is, for example, implemented by a computer and includes hardware components that are normally necessary for a server. Also, as shown in FIG. 2, the central management server TS includes a network communication unit 31, an authentication information management unit 32, and a storage unit 33. In the present application, the authentication information management unit 32 corresponds to a central information management unit, and the storage unit 33 corresponds to a central user information storing unit and a central management information storing unit.

The network communication unit 31 exchanges, via the network NWt, authentication and management information of users of the printing apparatuses Pa1, Pa2, Pb1, Pb2, Pc1, and Pc2 with the local management servers RSa, RSb, and RSc in the printing networks PNa, PNb, and PNc.

The authentication information management unit 32 registers authentication and management information of users of the printing apparatuses Pa1 through Pc2 in the printing networks PNa, PNb, and PNc connected to the network NWt in the authentication information table in the storage unit 33 and thereby manages the authentication and management information. More specifically, the authentication information management unit 32 registers, updates, and deletes the authentication and management information in the authentication information table, and exchanges the authentication and management information with the local management servers RSa, RSb, and RSc via the network communication unit 31.

The storage unit 33 stores the authentication information table containing the authentication and management information of users of the printing apparatuses Pa1 through Pc2 in the printing networks PNa, PNb, and PNc. For example, as shown in FIG. 8, the authentication information table contains authentication information including a card user ID, a login user name, and a login password, and management information including a current total number of printed pages and a total maximum number of printable pages (total maximum number of image formation pages) for each user of the printing apparatuses Pa1 through Pc2 in the printing networks PNa, PNb, and PNc.

Next, operations of the printing system 1 of this embodiment are described. In the printing system 1 of this embodiment, each of the printing apparatuses Pa1 through Pc2 in the printing networks PNa, PNb, and PNc connected via the network NWt restricts the users and limits the number of printable pages based on the authentication and management information in the authentication information table of itself. Each of the local management servers RSa, RSb, and RSc manages and updates the authentication and management information in the authentication information tables of the corresponding ones of the printing apparatuses Pa1 through Pc2 based on the authentication and management information in the authentication information table of itself. Further, the central management server TS manages the authentication and management information in the authentication information tables of the local management servers RSa, RSb, and RSc based on the authentication and management information in the authentication information table of itself.

An administrator of the printing system 1 enters the authentication information and the total maximum number of printable pages for each user of the printing apparatuses Pa1 through Pc2 in the central management server TS.

When the authentication information and the total maximum number of printable pages are entered, the authentication information management unit 32 of the central management server TS stores the authentication information and the total maximum number of printable pages in the authentication information table in the storage unit 33. At predetermined timings, the central management server TS sends authentication and management information in the authentication information table, via the network communication unit 31 and the network NWt, to the local management servers RSa, RSb, and RSc in the printing networks PNa, PNb, and PNc.

The network communication unit 21 of each of the local management servers RSa, RSb, and RSc receives the authentication and management information sent from the central management server TS. Then, the authentication information management unit 22 stores the received information in the authentication information table in the storage unit 23 as shown in FIGS. 5, 6, and 7. At predetermined timings, each of the local management servers RSa, RSb, and RSc sends the authentication and management information to the corresponding ones of the printing apparatuses Pa1 through Pc2.

The network communication unit 11 of each of the printing apparatuses Pa1 through Pc2 receives the authentication and management information sent from the corresponding one of the local management servers RSa, RSb, and RSc. Then, the authentication information management unit 15 stores the authentication and management information in the authentication information table in the storage unit 16 as shown in FIGS. 3 and 4.

Meanwhile, the capacity of the storage unit 16 of each of the printing apparatuses Pa1 through Pc2 is limited. Therefore, the printing system 1 is preferably configured to be able to set the maximum number of authentication and management information records for each of the printing apparatuses Pa1 through Pc2.

As described above, the central management server TS manages the entered authentication and management information for the printing apparatuses Pa1 through Pc2 of the printing networks PNa, PNb, and PNc, and sends the authentication and management information to the local management servers RSa, RSb, and RSc. Each of the local management servers RSa, RSb, and RSc receives the authentication and management information for the corresponding ones of the printing apparatuses Pa1 through Pc2 via the network communication unit 21. The authentication information management unit 22 of each of the local management servers RSa, RSb, and RSc stores the received authentication and management information in the authentication information table in the storage unit 23 and also sends the information to the corresponding ones of the printing apparatuses Pa1 through Pc2. When receiving the authentication and management information via the network communication unit 11 from the corresponding one of the local management servers RSa, RSb, and RSc, each of the printing apparatuses Pa1 through Pc2 stores the received authentication and management information in the authentication information table in the storage unit 16. Each of the printing apparatuses Pa1 through Pc2 restricts the users and limits the number of printable pages based on the authentication and management information in the authentication information table (number-of-printable-pages limiting process). Each of the local management servers RSa, RSb, and RSc manages the authentication and management information of the corresponding ones of the printing apparatuses Pa1 through Pc2 (information management process). The central management server TS manages the authentication and management information of the local management servers RSa, RSb, and RSc based on the authentication and management information in the authentication information table of itself (central information management process).

Thus, each of the storage unit 33 of the central management server TS, the storage units 23 of the local management servers RSa, RSb, and RSc, and the storage units 16 of the printing apparatuses Pa1 through Pc2 holds the corresponding authentication and management information.

When a user enters a print request, for example, by using the client terminal CLa1, the client terminal CLa1 attaches authentication information (e.g. a combination of a user name and a password, or a user ID) of the user to the print job corresponding to the print request, and sends the print job to, for example, the printing apparatus Pa1.

Also, a user may make a photocopy of a document using, for example, the printing apparatus Pa2 that is an MFP. In this case, the user inserts an ID card (e.g. employee card) in a card reader connected to the printing apparatus Pa2 and thereby enters authentication information (e.g. card user ID) for identifying the user in the printing apparatus Pa2.

Figure 9:
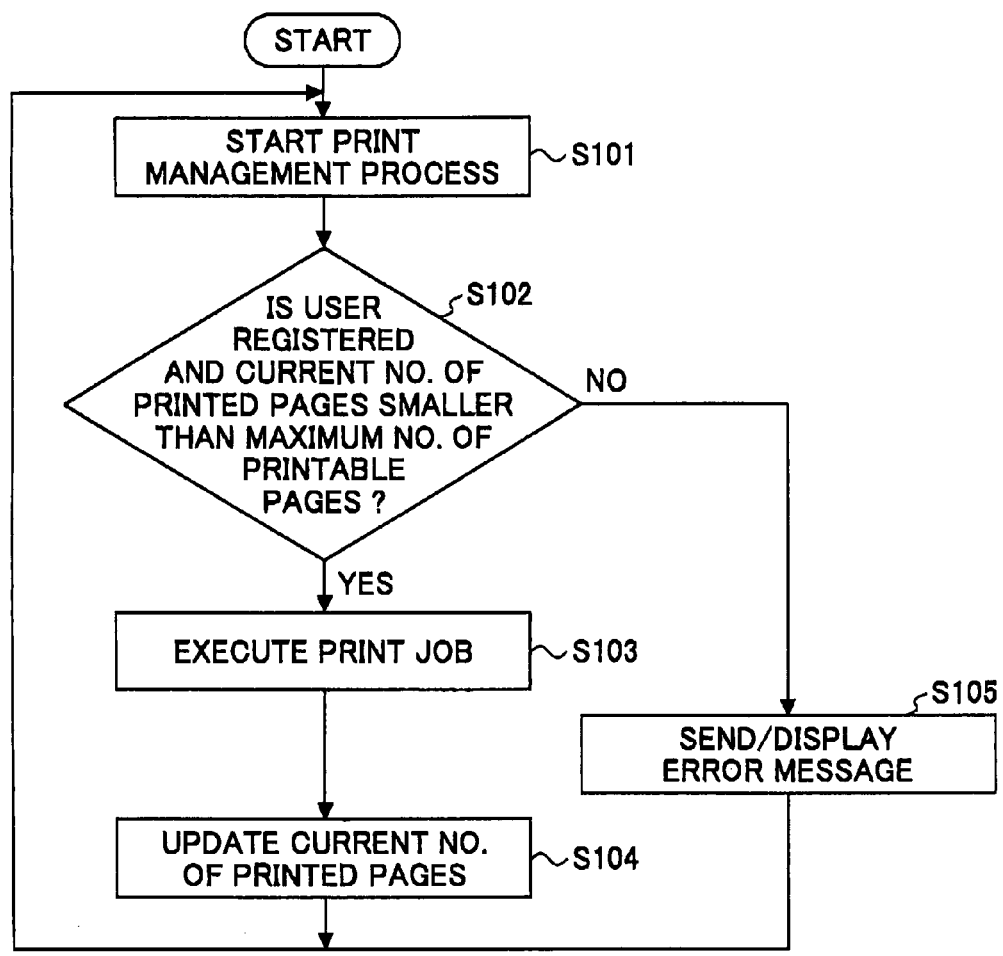
FIG. 9 is a flowchart showing an exemplary print management process by a printing apparatus of FIG. 1.

FIG. 9 is a flowchart showing an exemplary print management process by a printing apparatus. Here, for descriptive purposes, it is assumed that a user enters a print request using the client terminal CLa1 to print a document on the printing apparatus Pa1. As shown in FIG. 9, when receiving a print job from the client terminal CLa1, the printing apparatus Pa1 starts a print management process for the print job (step S101). The authentication information management unit 15 of the printing apparatus Pa1 obtains the authentication information and the management information (maximum numbers of printable pages and current numbers of printed pages) in the authentication information table in the storage unit 16 and sends the obtained information to the authentication unit 12. The authentication unit 12 determines whether the authentication information attached to the print job is present in the authentication information received from the authentication information management unit 15, and thereby determines whether the user of the print job is authorized to print a document on the printing apparatus Pa1. If the user is an authorized user, the print permission unit 13 determines whether the current number of printed pages of the user is smaller than the maximum number of printable pages of the user (step S102). If the current number of printed pages is smaller than the maximum number of printable pages, the print permission unit 13 permits the execution of the print job. Then, the print job execution unit 14 executes the print job and prints print data in the print job on paper (step S103).

Thus, according to this embodiment, a print management process can be performed within each of the printing apparatuses Pa1 through Pc2 without reducing the response speed of the printing system 1.

After completing the print job, the printing apparatus Pa1 updates the current number of printed pages of the user in the authentication information table in the storage unit 16 based on the number of pages (number of image formation pages) printed in the print job (step S104).

If the authentication information attached to the print job is not present in the authentication information contained in the authentication information table or if the current number of printed pages is equal to or larger than the maximum number of printable pages, the execution of the print job is denied and an error message is displayed on the console display of the printing apparatus Pa1 or sent via the network NWa to the client terminal CLa1 from which the print job is sent (step S105).

After the print management process, the authentication information tables of the central management server TS, the local management servers RSa, RSb, and RSc, and the printing apparatuses Pa1 through Pc2 are updated.

Figure 10:
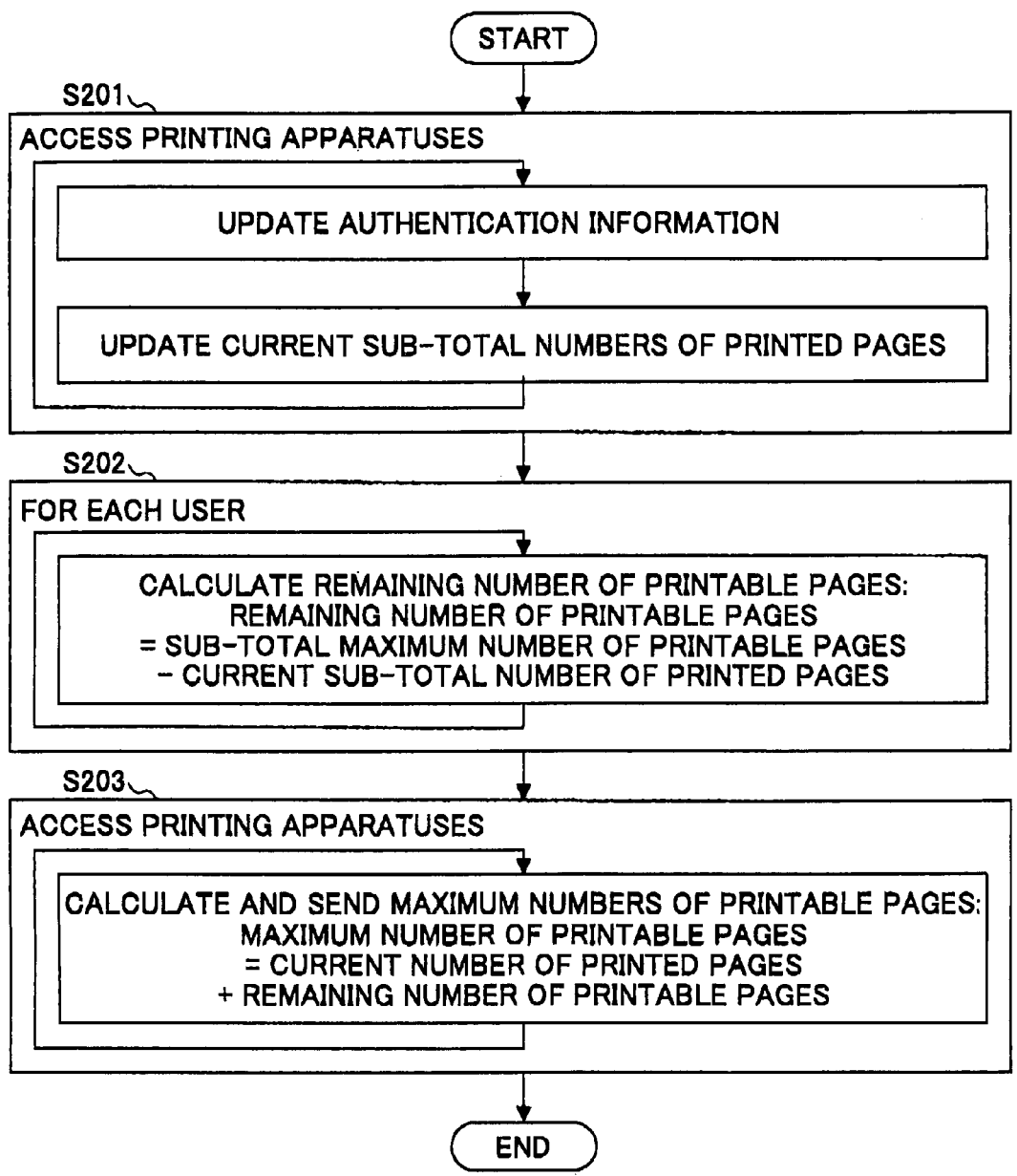
FIG. 10 is a flowchart showing an exemplary information management process between local management servers and printing apparatuses of FIG. 1.

FIG. 10 is a flowchart showing an exemplary information management process between the local management servers RSa, RSb, and RSc and the printing apparatuses Pa1 through Pc2. The authentication information management unit 22 of each of the local management servers RSa, RSb, and RSc sequentially accesses via the network communication unit 21 the corresponding ones of the printing apparatuses Pa1 through Pc2 at predetermined time intervals, updates the authentication information that has been changed, obtains updated current numbers of printed pages from the printing apparatuses, calculates the sum of the updated current numbers of printed pages for each user, and updates the corresponding current sub-total numbers of printed pages in the authentication information table in the storage unit 23 of itself based on the calculated values (step S201).

After updating the current sub-total numbers of printed pages, each of the local management servers RSa, RSb, and RSc calculates the remaining number of printable pages for each user registered in the authentication information table by subtracting the updated current sub-total number of printed pages from the sub-total maximum number of printable pages of the corresponding user (step S202).

After calculating the remaining numbers of printable pages, each of the local management servers RSa, RSb, and RSc calculates the maximum number of printable pages for each user in each of the corresponding ones of the printing apparatuses Pa1 through Pc2 by adding the remaining number of printable pages and the current number of printed pages of the user, and sends the calculated maximum numbers of printable pages of users to the corresponding ones of the printing apparatuses Pa1 through Pc2 (step S203). When receiving the calculated maximum numbers of printable pages, each of the printing apparatuses Pa1 through Pc2 updates the corresponding information in the authentication information table in the storage unit 16 based on the received maximum numbers of printable pages.

Thus, according to the above embodiment, the maximum numbers of printable pages contained in the authentication information table in the storage unit 16 of each of the printing apparatuses Pa1 through Pc2 are updated periodically. This configuration makes it possible to effectively manage the maximum number of printable pages for each user.

Let us assume that the local management server RSa manages the authentication and management information of the printing apparatuses Pa1 and Pa2 as shown in FIG. 1; the authentication information table of each of the printing apparatuses Pa1 and Pa2 contains authentication information and management information of two users Ua and Ub as shown in FIGS. 3 and 4; and the authentication information of each of the users Ua and Ub in the printing apparatus Pa1 is the same as that in the printing apparatus Pa2.

As shown in FIGS. 3 and 4, the user Ua has printed 300 pages on the printing apparatus Pa1 and 250 pages on the printing apparatus Pa2.

For example, the local management server RSa accesses the printing apparatuses Pa1 and Pa2 in sequence to obtain the current numbers of printed pages of the user Ua, calculates the sum of the current numbers of printed pages, and updates the current sub-total number of printed pages of the user Ua in the authentication information table in the storage unit 23 of itself by the calculated value. In this example, as shown in FIG. 5, the sum of the current numbers of printed pages (or the current sub-total number of printed pages) of the user Ua in the printing apparatuses Pa1 and Pa2 is 550 (=300+250).

The local management server RSa calculates the remaining number of printable pages (800) of the user Ua by subtracting the updated current sub-total number of printed pages (550) from the sub-total maximum number of printable pages (1350) of the user Ua (1350−550=800). Then, the local management server RSa calculates the maximum number of printable pages (1100) of the user Ua in the printing apparatus Pa1 by adding the current number of printed pages (300) and the remaining number of printable pages (800), and sends the calculated maximum number of printable pages to the printing apparatus Pa1. Also, the local management server RSa calculates the maximum number of printable pages (1050) of the user Ua in the printing apparatus Pa2 by adding the current number of printed pages (250) and the remaining number of printable pages (800), and sends the calculated maximum number of printable pages to the printing apparatus Pa2. When receiving the maximum numbers of printable pages, the printing apparatuses Pa1 and Pa2 update the corresponding information in their respective authentication information tables.

In the printing system 1 of this embodiment, as describe above, the printing networks PNa, PNb, and PNc are connected via the network NWt. Each of the printing networks PNa, PNb, and PNc includes the printing apparatuses Pa1 and Pa2 (Pb1 and Pb2, or Pc1 and Pc2), the client terminals CLa1 and CLa2 (CLb1 and CLb2, or CLc1 and CLc2) that use the printing apparatuses, and the local management server RSa (, RSb, or RSc) that manages the authentication and management information in the printing apparatuses.

Figure 11:
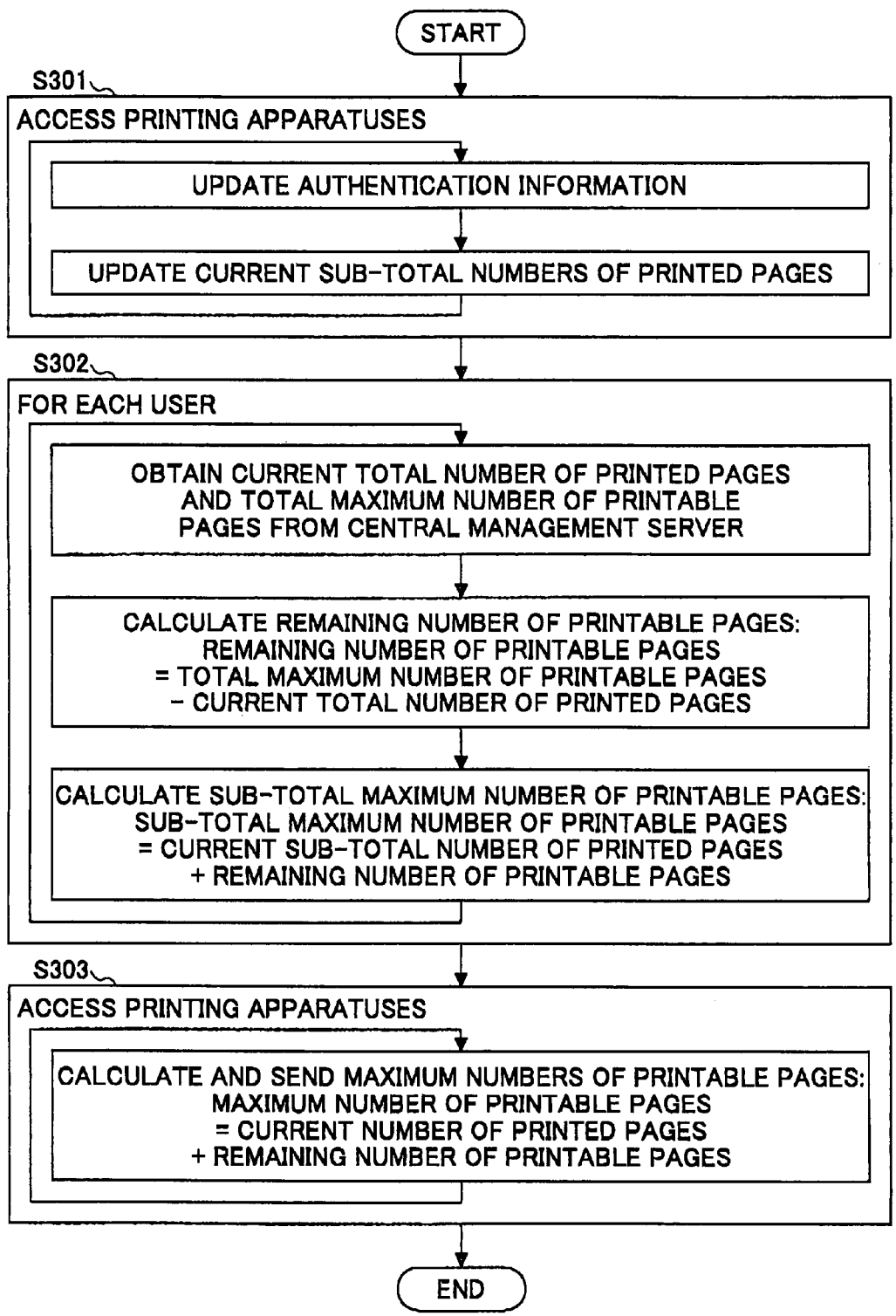
FIG. 11 is a flowchart showing an exemplary information management process between local management servers and a central management server of FIG. 1.

FIG. 11 is a flowchart showing an exemplary information management process between the local management servers RSa, RSb, and RSc and the central management server TS. The authentication information management unit 22 of each of the local management servers RSa, RSb, and RSc sequentially accesses the corresponding ones of the printing apparatuses Pa1 through Pc2, updates the authentication information that has been changed, obtains updated current numbers of printed pages from the printing apparatuses, calculates the sum of the updated current numbers of printed pages for each user, and updates the corresponding current sub-total numbers of printed pages in the authentication information table in the storage unit 23 of itself based on the calculated values (step S301).

The central management server TS accesses the local management servers RSa, RSb, and RSc in sequence to obtain the current sub-total numbers of printed pages of users, calculates the sum of the current sub-total numbers of printed pages for each user, and updates the current total numbers of printed pages in the authentication information table in the storage unit 33 by the calculated values. The central management server TS accesses the local management servers RSa, RSb, and RSc at timings predetermined by an administrator to perform a central user information providing process of providing authentication information and to perform a central information management process of updating the authentication information and the sub-total maximum numbers of printable pages of users.

After updating the current sub-total numbers of printed pages of users, each of the local management servers RSa, RSb, and RSc accesses the central management server TS to obtain the current total numbers of printed pages and the total maximum numbers of printable pages of the corresponding users, and calculates the remaining number of printable pages for each user by subtracting the current total number of printed pages from the total maximum number of printable pages. Then, each of the local management servers RSa, RSb, and RSc calculates the sub-total maximum number of printable pages for each user by adding the remaining number of printable pages and the current sub-total number of printed pages of the user, and updates the corresponding information in the authentication information table in the storage unit 23 by the calculated sub-total maximum number of printable pages for each user (step S302).

Also, each of the local management servers RSa, RSb, and RSc calculates the maximum number of printable pages for each user in each of the corresponding ones of the printing apparatuses Pa1 through Pc2 by adding the current number of printed pages and the remaining number of printable pages of the user, and sends the calculated maximum numbers of printable pages to the corresponding ones of the printing apparatuses Pa1 through Pc2 (step S303). When receiving the calculated maximum numbers of printable pages, the printing apparatuses Pa1 through Pc2 update the corresponding information in their respective authentication information tables.

Let us assume that the local management server RSa manages the authentication and management information of the printing apparatuses Pa1 and Pa2 as shown in FIG. 1; the authentication information table of each of the printing apparatuses Pa1 and Pa2 contains authentication information and management information of two users Ua and Ub as shown in FIGS. 3 and 4; and the authentication information of each of the users Ua and Ub in the printing apparatus Pa1 is the same as that in the printing apparatus Pa2.

As shown in FIGS. 3 and 4, the user Ua has printed 300 pages on the printing apparatus Pa1 and 250 pages on the printing apparatus Pa2.

The local management server RSa accesses the printing apparatuses Pa1 and Pa2 in sequence to obtain the current numbers of printed pages of, for example, the user Ua, calculates the sum of the current numbers of printed pages, and updates the current sub-total number of printed pages of the user Ua in the authentication information table in the storage unit 23 of itself. In this example, as shown in FIG. 5, the current sub-total number of printed pages of the user Ua is 550.

The central management server TS accesses the local management servers RSa, RSb, and RSc to obtain the current sub-total numbers of printed pages of the user Ua, calculates the sum of the current sub-total numbers of printed pages, and updates the current total number of printed pages of the user Ua in the authentication information table in the storage unit 33 by the calculated value. In this example, as shown in FIG. 8, the current total number of printed pages of the user Ua is 700.

Each of the local management servers RSa, RSb, and RSc accesses the central management server TS to obtain the current total number of printed pages and the total maximum number of printable pages of the user Ua, and calculates the remaining number of printable pages of the user Ua by subtracting the current total number of printed pages from the total maximum number of printable pages. In this example, as shown in FIG. 8, the total maximum number of printable pages of the user Ua is 1500, the current total number of printed pages is 700, and therefore the remaining number of printable pages is 800. Each of the local management servers RSa, RSb, and RSc calculates the sub-total maximum number of printable pages of the user Ua in the corresponding printing network PNa, PNb, or PNc by adding the remaining number of printable pages and the current sub-total number of printed pages, and updates the corresponding information in the authentication information table in the storage unit 23 by the calculated sub-total maximum number of printable pages as shown in FIGS. 5 through 7.

For example, in the authentication information table of the local management server RSa shown in FIG. 5, the current sub-total number of printed pages of the user Ua is 550. Therefore, the sub-total maximum number of printable pages of the user Ua becomes 1350 (=550+800).

In the exemplary information management process described above, each of the local management servers RSa, RSb, and RSc accesses the corresponding ones of the printing apparatuses Pa1 through Pc2 to obtain the current numbers of printed pages of users and thereby to update the current sub-total numbers of printed pages of the corresponding users. However, the method of updating the current sub-total numbers of printed pages is not limited to that described above. For example, each of the printing apparatuses Pa1 through Pc2 may be configured to update the current number of printed pages in the authentication information table in the storage unit 16 of itself, each time a print job is completed, based on the number of pages printed in the print job, and to send the number of pages printed in the print job together with the card user ID to the corresponding one of the local management servers RSa, RSb, and RSc. And each of the local management servers RSa, RSb, and RSc may be configured to update the current sub-total number of printed pages of the corresponding user in the authentication information table in the storage unit 23 based on the number of pages printed sent from the corresponding one of the printing apparatuses Pa1 through Pc2.

In summary, in the printing system 1 of this embodiment, the local management servers RSa, RSb, and RSc provide authentication information (user information) of users to the corresponding printing apparatuses Pa1 through Pc2, and update the maximum numbers of printable pages (maximum numbers of image formation pages) of the users in the authentication information tables of the printing apparatuses Pa1 through Pc2. The printing apparatuses Pa1 through Pc2 authenticate users based on the authentication information and limit printing by the authenticated users based on the current numbers of printed pages (current numbers of image formation pages) and the maximum numbers of printable pages. Also, the local management servers RSa, RSb, and RSc access the printing apparatuses Pa1 through Pc2 at predetermined timings to obtain the current numbers of printed pages of the users, calculate the current sub-total numbers of printed pages from the obtained current numbers of printed pages, calculate the maximum numbers of printable pages from the current sub-total numbers of printed pages and the sub-total maximum numbers of printable pages (sub-total maximum numbers of image formation pages), and send the calculated maximum numbers of printable pages to the corresponding printing apparatuses Pa1 through Pc2.

When a user sends a print job to one of the printing apparatuses Pa1 through Pc2, the one of the printing apparatuses Pa1 through Pc2 performs an authentication process of authenticating the user and a print management process of determining whether to permit the execution of the print job. This configuration makes it possible to perform a print management process without reducing the response speed of the printing system 1 and, at the same time, makes it possible to reduce the work load of the printing apparatuses Pa1 through Pc2.

Also in the printing system 1 of this embodiment, the central management server TS provides authentication information of users of the printing apparatuses Pa1 through Pc2, which authentication information is associated with the printing apparatuses Pa1 through Pc2, to the local management servers RSa, RSb, and RSc via the network NWt. The central management server TS also accesses the local management servers RSa, RSb, and RSc at predetermined timings to obtain the current sub-total numbers of printed pages of the users, calculates the current total numbers of printed pages of the users from the obtained current sub-total numbers of printed pages, calculates the sub-total maximum numbers of printable pages from the current total numbers of printed pages and the total maximum numbers of printable pages, and sends the calculated sub-total maximum numbers of printable pages to the local management servers RSa, RSb, and RSc (central information management process).

This configuration makes it possible to perform a print management process by each of the printing apparatuses Pa1 through Pc2 distributed in a large network without reducing the response speed of the printing system 1 and, at the same time, makes it possible to reduce the work load of the printing apparatuses Pa1 through Pc2.

Alternatively, each of the printing apparatuses Pa1 through Pc2 may be configured to update the current number of printed pages of a user each time a print job is completed based on the number of pages printed in the print job, and send the number of pages printed in the print job to the corresponding one of the local management servers RSa, RSb, and RSc. And each of the local management servers RSa, RSb, and RSc may be configured to update the current sub-total number of printed pages of the user in the authentication information table in the storage unit 23 based on the number of printed pages sent from the corresponding one of the printing apparatuses Pa1 through Pc2.

This configuration makes it possible to simplify the management process performed by the local management servers RSa, RSb, and RSc.

Further in the printing system 1 of this embodiment, each of the local management servers RSa, RSb, and RSc updates the authentication information of users in the corresponding ones of the printing apparatuses Pa1 through Pc2 at predetermined or arbitrary timings based on the authentication information (user information) in the authentication information table in the storage unit 23 of itself. And the central management server TS updates the authentication information in the local management servers RSa, RSb, and RSc at predetermined or arbitrary timings based on the authentication information in the authentication information in the storage unit 33 of itself.

This configuration makes it possible to manage user information in an integrated and efficient manner.

Second Embodiment

Figure 12:
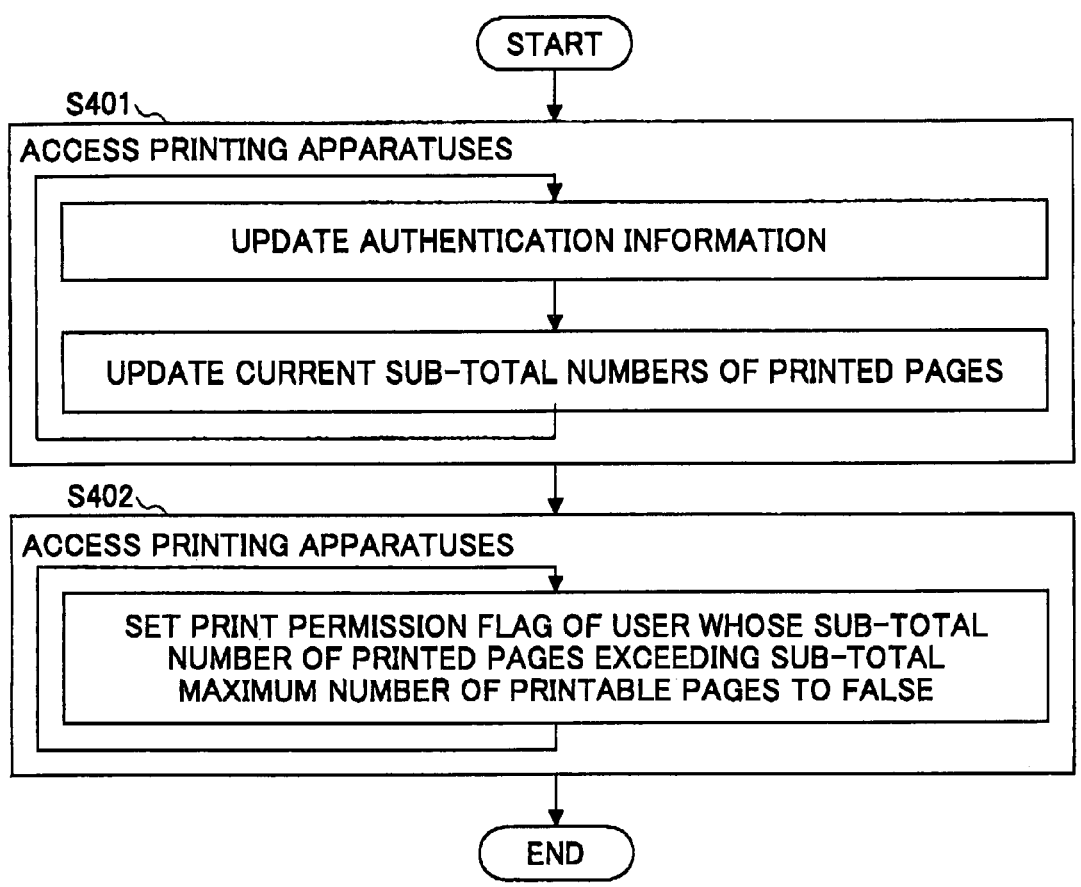
FIG. 12 is a flowchart showing an exemplary information management process by a local management server in a printing system implemented by an image formation management system, an image formation management method, and a storage medium containing an image formation management program of a second embodiment of the present invention.

An image formation management system, an image formation management method, and a storage medium containing an image formation management program according to a second embodiment of the present invention are described below with reference to FIGS. 12 through 15. FIG. 12 is a flowchart showing an exemplary information management process by a local management server in a printing system implemented by an image formation management system, an image formation management method, and a storage medium containing an image formation management program of the second embodiment of the present invention.

In the descriptions below, the same reference numbers are used for components corresponding to those of the printing system 1 of the first embodiment.

In the printing system 1 of the second embodiment, each of the local management servers RSa, RSb, and RSc of the printing networks PNa, PNb, and PNc obtains the current numbers of printed pages of users from the corresponding ones of the printing apparatuses Pa1 through Pc2, calculates the current sub-total numbers of printed pages of the users from the obtained current numbers of printed pages, and determines whether the current sub-total numbers of printed pages are equal to or larger than the sub-total maximum numbers of printable pages of the corresponding users. If the current sub-total number of printed pages of a user is equal to or larger than the sub-total maximum number of printable pages assigned to the user, the local management server RSa, RSb, or RSc sends print-not-allowable information to the corresponding ones of the printing apparatuses Pa1 through Pc2. When receiving the print-not-allowable information, each of the corresponding ones of the printing apparatuses Pa1 through Pc2 changes the print permission flag of the user in the authentication information table in the storage unit 16 from "true" (permitted) to "false" (not-permitted). The printing apparatuses Pa1 through Pc2 of this embodiment are configured to control the execution of print jobs by referring to the print permission flags.

As shown in FIG. 12, each of the local management servers RSa, RSb, and RSc accesses the corresponding ones of the printing apparatuses Pa1 through Pc2 in sequence to obtain the authentication information and the current numbers of printed pages of users, updates the authentication information of the users in the authentication information table in the storage unit 23 if there are any changes, and updates the current sub-total numbers of printed pages of the users in the authentication information table based on the obtained current numbers of printed pages (step S401).

Then, each of the local management servers RSa, RSb, and RSc determines whether the updated current sub-total number of printed pages is equal to or larger than the sub-total maximum number of printable pages for each user. If the current sub-total number of printed pages of a user is equal to or larger than the sub-total maximum number of printable pages, the local management server RSa, RSb, or RSc sends print-not-allowable information together with the card user ID to the corresponding ones of the printing apparatuses Pa1 through Pc2.

When receiving the print-not-allowable information, each of the corresponding ones of the printing apparatuses Pa1 through Pc2 changes the print permission flag of the user in the authentication information table in the storage unit 16 from "true" to "false" (step S402).

Figure 14:
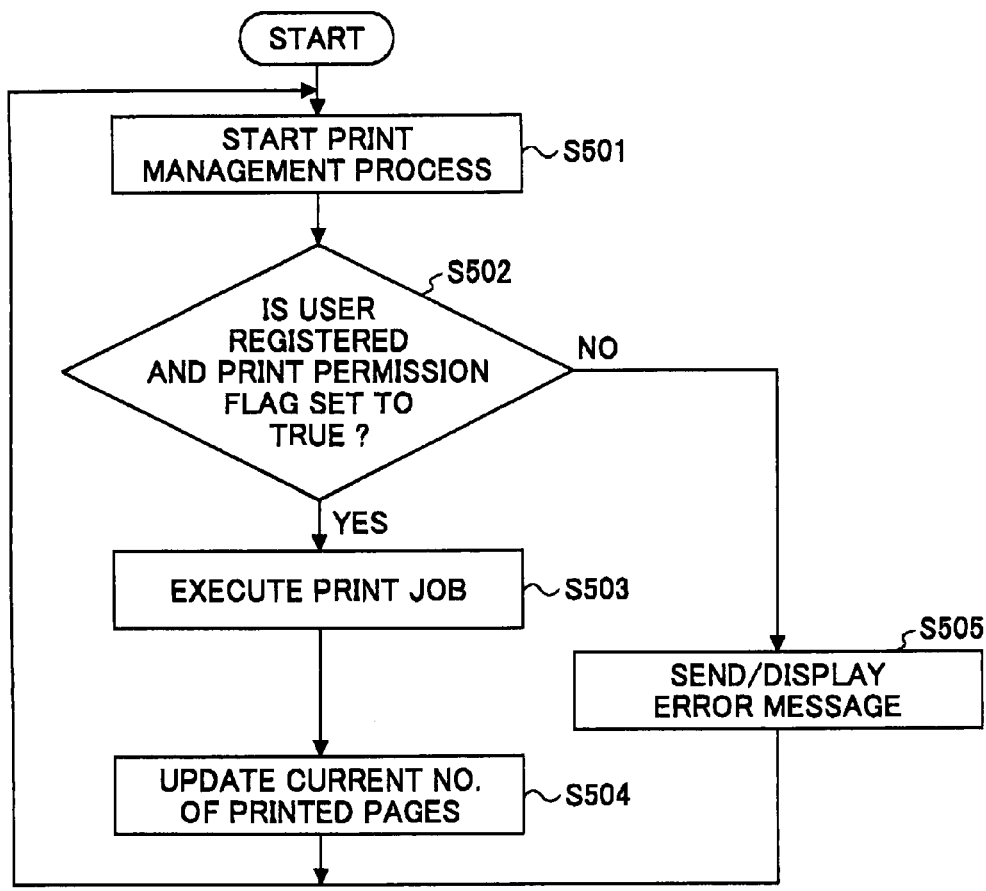
FIG. 14 is a flowchart showing an exemplary print management process by a printing apparatus in a printing system implemented by an image formation management system, an image formation management method, and a storage medium containing an image formation management program of a second embodiment of the present invention.

FIG. 14 is a flowchart showing an exemplary print management process by a printing apparatus. Here, for descriptive purposes, it is assumed that a user enters a print request using the client terminal CLa1 to print a document on the printing apparatus Pa1. As shown in FIG. 14, when receiving a print job from the client terminal CLa1, the printing apparatus Pa1 starts a print management process for the print job (step S501). The authentication information management unit 15 of the printing apparatus Pa1 obtains the authentication information and the print permission flags in the authentication information table in the storage unit 16 and sends them to the authentication unit 12. The authentication unit 12 determines whether the authentication information attached to the print job is present in the authentication information received from the authentication information management unit 15, and thereby determines whether the user of the print job is authorized to print a document on the printing apparatus Pa1. If the user is an authorized user, the print permission unit 13 determines whether the print permission flag of the user is set to "true" (step S502). If the print permission flag of the user is set to "true", the print permission unit 13 permits the execution of the print job. Then, the print job execution unit 14 executes the print job and prints print data in the print job on paper (step S503).

Thus, according to this embodiment, a print management process can be performed within each of the printing apparatuses Pa1 through Pc2 without reducing the response speed of the printing system 1.

After completing the print job, the printing apparatus Pa1 updates the current number of printed pages of the user in the authentication information table in the storage unit 16 based on the number of pages printed in the print job (step S504).

If the authentication information attached to the print job is not present in the authentication information contained in the authentication information table or if the print permission flag is set to "false", the execution of the print job is denied and an error message is displayed on the console display of the printing apparatus Pa1 or sent via the network NWa to the client terminal CLa1 from which the print job is sent (step S505).

Let us assume that the local management server RSa of the printing network PNa manages the authentication and management information of the printing apparatuses Pa1 and Pa2 as shown in FIG. 1; the authentication information table of each of the printing apparatuses Pa1 and Pa2 contains authentication information and management information of two users Ua and Ub as shown in FIGS. 3 and 4; and the authentication information of each of the users Ua and Ub in the printing apparatus Pa1 is the same as that in the printing apparatus Pa2. As shown in FIGS. 3 and 4, the user Ua has printed 300 pages on the printing apparatus Pa1 and 250 pages on the printing apparatus Pa2. For example, the local management server RSa accesses the printing apparatuses Pa1 and Pa2 in sequence to obtain the current numbers of printed pages of the user Ua, calculates the sum of the current numbers of printed pages, and updates the current sub-total number of printed pages of the user Ua in the authentication information table in the storage unit 23 of itself by the calculated value.

In this example, as shown in FIG. 5, the sum of the current numbers of printed pages (or the current sub-total number of printed pages) of the user Ua in the printing apparatuses Pa1 and Pa2 is 550 (=300+250).

When the current sub-total number of printed pages (550) of the user Ua is lower than the sub-total maximum number of printable pages (1350) as in FIG. 5, the local management server RSa leaves the print permission flags of the printing apparatuses Pa1 and Pa2 as they are. If the current sub-total number of printed pages of the user Ua is equal to or larger than the sub-total maximum number of printable pages, the local management server RSa sends print-not-allowable information to the printing apparatuses Pa1 and Pa2 and thereby causes the printing apparatuses Pa1 and Pa2 to set the print permission flags of the user Ua in their authentication information tables to "false".

With the print permission flags set to "false", print requests or print jobs of the user Ua to the printing apparatuses Pa1 and Pa2 are denied as described with reference to FIG. 14.

After the print management process, the authentication information tables of the central management server TS and the corresponding one of the local management servers RSa, RSb, and RSc are updated.

Figure 15:
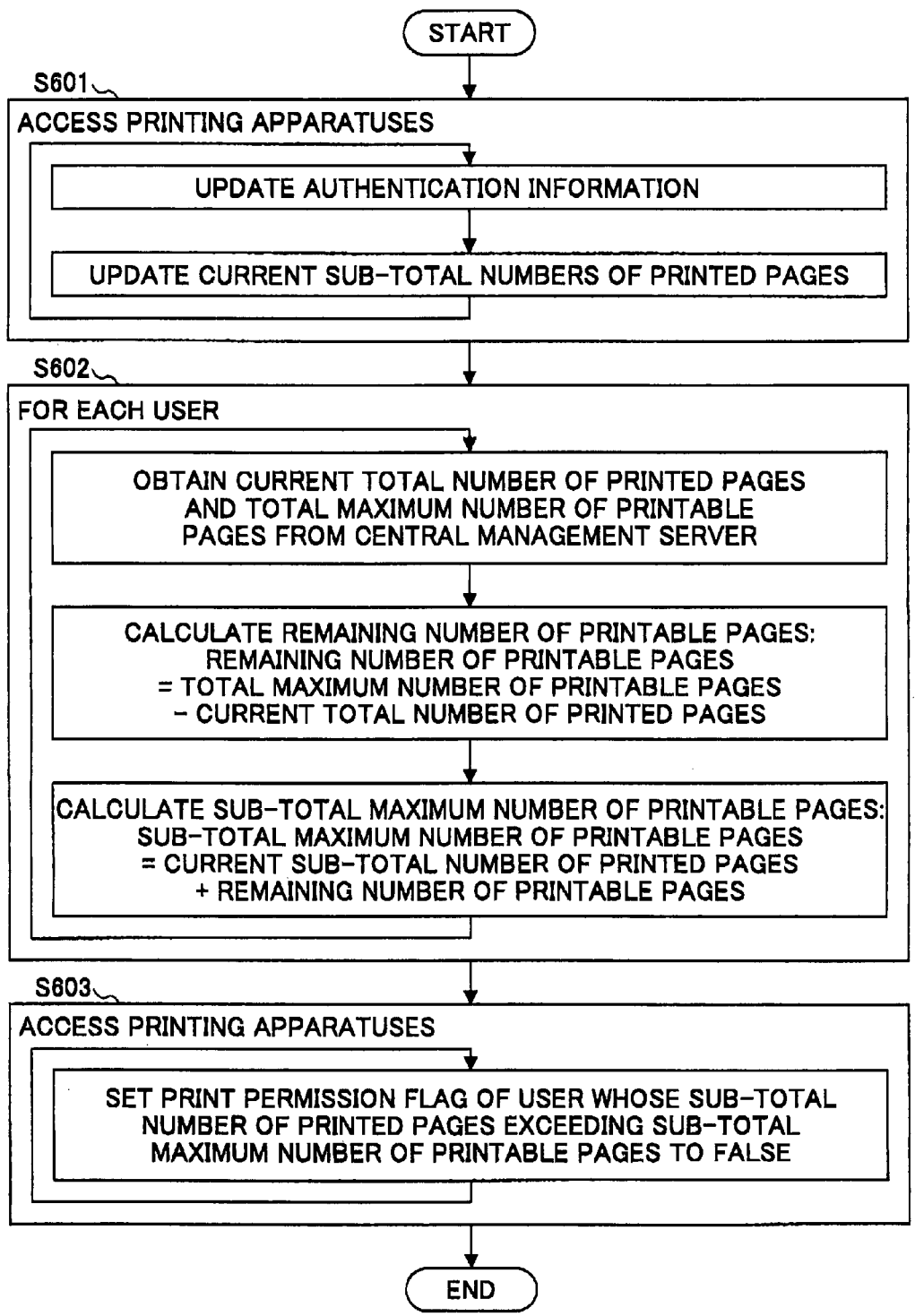
FIG. 15 is a flowchart showing an exemplary information management process between a local management server and a central management server in a printing system implemented by an image formation management system, an image formation management method, and a storage medium containing an image formation management program of a second embodiment of the present invention.

FIG. 15 is a flowchart showing an exemplary information management process between the local management servers RSa, RSb, and RSc and the central management server TS. The authentication information management unit 22 of each of the local management servers RSa, RSb, and RSc sequentially accesses the corresponding ones of the printing apparatuses Pa1 through Pc2 at predetermined time intervals, obtains updated current numbers of printed pages from the printing apparatuses, calculates the sum of the updated current numbers of printed pages for each user, and updates the corresponding current sub-total numbers of printed pages in the authentication information table in the storage unit 23 of itself based on the calculated values (step S601).

The central management server TS accesses the local management servers RSa, RSb, and RSc in sequence to obtain the current sub-total numbers of printed pages of users, calculates the sum of the current sub-total numbers of printed pages for each user, and updates the current total numbers of printed pages of the users in the authentication information table in the storage unit 33 by the calculated values. The central management server TS accesses the local management servers RSa, RSb, and RSc at timings predetermined by an administrator to update the authentication information and the current total numbers of printed pages of users.

After updating the current sub-total numbers of printed pages of users, each of the local management servers RSa, RSb, and RSc accesses the central management server TS to obtain the current total numbers of printed pages and the total maximum numbers of printable pages of the corresponding users, and calculates the remaining number of printable pages for each user by subtracting the current total number of printed pages from the total maximum number of printable pages. Then, each of the local management servers RSa, RSb, and RSc calculates the sub-total maximum number of printable pages for each user by adding the remaining number of printable pages and the current sub-total number of printed pages of the user, and updates the corresponding information in the authentication information table in the storage unit 23 by the calculated sub-total maximum number of printable pages for each user (step S602).

Next, each of the local management servers RSa, RSb, and RSc determines whether the updated current sub-total number of printed pages is larger than the sub-total maximum number of printable pages for each user. If the current sub-total number of printed pages of a user is equal to or larger than the sub-total maximum number of printable pages, the local management server RSa, RSb, or RSc sends print-not-allowable information together with the card user ID to the corresponding ones of the printing apparatuses Pa1 through Pc2. When receiving the print-not-allowable information, each of the corresponding ones of the printing apparatuses Pa1 through Pc2 changes the print permission flag of the user in the authentication information table in the storage unit 16 from "true" to "false" (step S603).

As described with reference to FIG. 14, each of the printing apparatuses determines whether to execute print jobs based on the print permission flags in the authentication information table in the storage unit 16.

Let us assume that the local management server RSa of the printing network PNa manages the authentication and management information of the printing apparatuses Pa1 and Pa2 as shown in FIG. 1; the authentication information table of each of the printing apparatuses Pa1 and Pa2 contains authentication information and management information of two users Ua and Ub as shown in FIGS. 3 and 4; and the authentication information of each of the users Ua and Ub in the printing apparatus Pa1 is the same as that in the printing apparatus Pa2. As shown in FIGS. 3 and 4, the user Ua has printed 300 pages on the printing apparatus Pa1 and 250 pages on the printing apparatus Pa2. For example, the local management server RSa accesses the printing apparatuses Pa1 and Pa2 in sequence to obtain the current numbers of printed pages of the user Ua, calculates the sum of the current numbers of printed pages, and updates the current sub-total number of printed pages of the user Ua in the authentication information table in the storage unit 23 of itself by the calculated value.

In this example, as shown in FIG. 5, the sum of the current numbers of printed pages (or the current sub-total number of printed pages) of the user Ua in the printing apparatuses Pa1 and Pa2 is 550 (=300+250).

The central management server TS accesses the local management servers RSa, RSb, and RSc to obtain the current sub-total numbers of printed pages of the user Ua, calculates the sum of the current sub-total numbers of printed pages, and updates the current total number of printed pages of the user Ua in the authentication information table in the storage unit 33 by the calculated value. In this example, as shown in FIG. 8, the current total number of printed pages of the user Ua is 700.

Each of the local management servers RSa, RSb, and RSc accesses the central management server TS to obtain the current total number of printed pages and the total maximum number of printable pages of the user Ua, and calculates the remaining number of printable pages of the user Ua by subtracting the current total number of printed pages from the total maximum number of printable pages. In this example, the total maximum number of printable pages of the user Ua is 1500, the current total number of printed pages of the user Ua is 700, and therefore the remaining number of printable pages of the user Ua is 800.

After calculating the remaining number of printable pages, each of the local management servers RSa, RSb, and RSc calculates the sub-total maximum number of printable pages for each user by adding the remaining number of printable pages and the current sub-total number of printed pages of the user in the authentication information table in the storage unit 23.

For example, in the case of the local management server RSa, the current sub-total number of printed pages of the user Ua is 550. Therefore, the local management server RSa updates the sub-total maximum number of printable pages of the user Ua in the authentication information table to 1350 (=550+800) as shown in FIG. 5 and also sends the remaining number of printable pages (800) to the printing apparatuses Pa1 and Pa2.

Next, each of the local management servers RSa, RSb, and RSc determines whether the current sub-total number of printed pages of the user Ua is equal to or larger than the sub-total maximum number of printable pages. If the current sub-total number of printed pages is equal to or larger than the sub-total maximum number of printable pages, the local management server RSa, RSb, or RSc sends print-not-allowable information to the corresponding ones of the printing apparatuses Pa1 through Pc2 and thereby causes the printing apparatuses to set the print permission flags to "false". If not, the local management server RSa, RSb, or RSc leaves the print permission flags as "true".

Thus, in the printing system 1 of this embodiment, the local management servers RSa, RSb, and RSc obtain the current numbers of printed pages of users from the printing apparatuses Pa1 through Pc2, calculate the current sub-total numbers of printed pages of the users from the obtained current numbers of printed pages, determine whether to permit the execution of print jobs of the users based on the current sub-total numbers of printed pages and the sub-total maximum numbers of printable pages, and send print permission information to the corresponding printing apparatuses Pa1 through Pc2 based on the determination results. And the printing apparatuses Pa1 through Pc2 determine whether to execute print jobs of the users based on the print permission information.

In other words, the second embodiment makes it possible for the printing apparatuses Pa1 through Pc2 to quickly and appropriately control the number of pages printable by users based on print permission flags.

Third Embodiment

Figure 16:
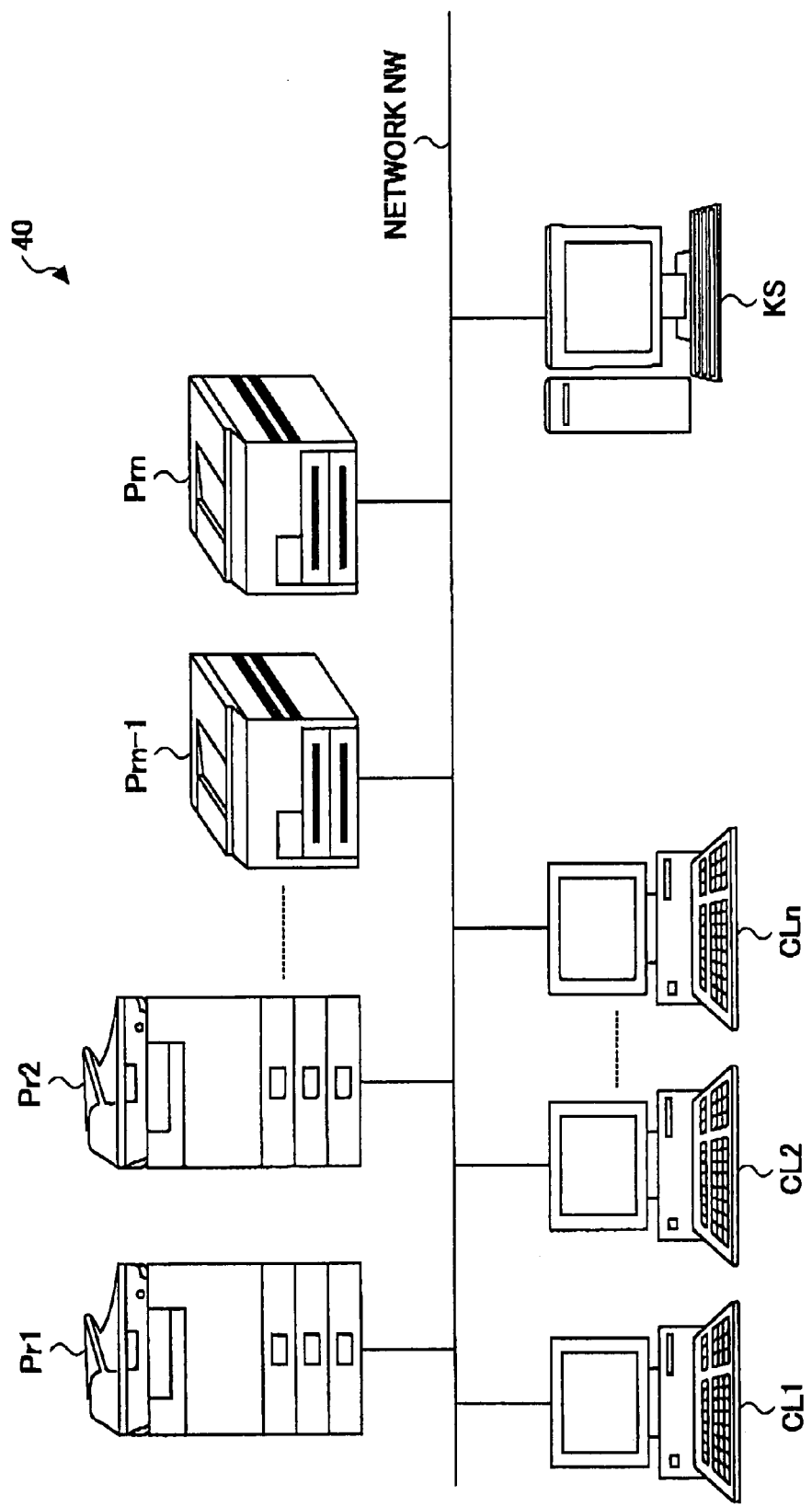
FIG. 16 is a drawing illustrating an exemplary configuration of a printing system implemented by an image formation management system, an image formation management method, and a storage medium containing an image formation management program of a third embodiment of the present invention.

An image formation management system, an image formation management method, and a storage medium containing an image formation management program according to a third embodiment of the present invention are described below with reference to FIGS. 16 through 26. FIG. 16 is a drawing illustrating an exemplary configuration of a printing system 40 implemented by an image formation management system, an image formation management method, and a storage medium containing an image formation management program of the third embodiment.

The printing system 40 includes client terminals CL1 through CLn, printing apparatuses Pr1 through Prn, and a management apparatus KS that are connected to each other via a network NW such as a LAN. The numbers of the client terminals CL1 through CLn and the printing apparatuses Pr1 through Prn are not limited to specific values.

The client terminals CL1 through CLn are, for example, implemented by personal computers. Users create documents and enter print requests for printing those documents by using the client terminals CL1 through CLn. The client terminals CL1 through CLn send print jobs corresponding to the print requests to the printers Pr1 through Prn via the network NW. In the printing system 1, when entering print requests, the users are required to enter authentication information (e.g. a combination of a user name and a password, or a user ID). The client terminals CL1 through CLn attach the authentication information (or user information) to the print jobs and send them to the printing apparatuses Pr1 through Prn.

Figure 17:
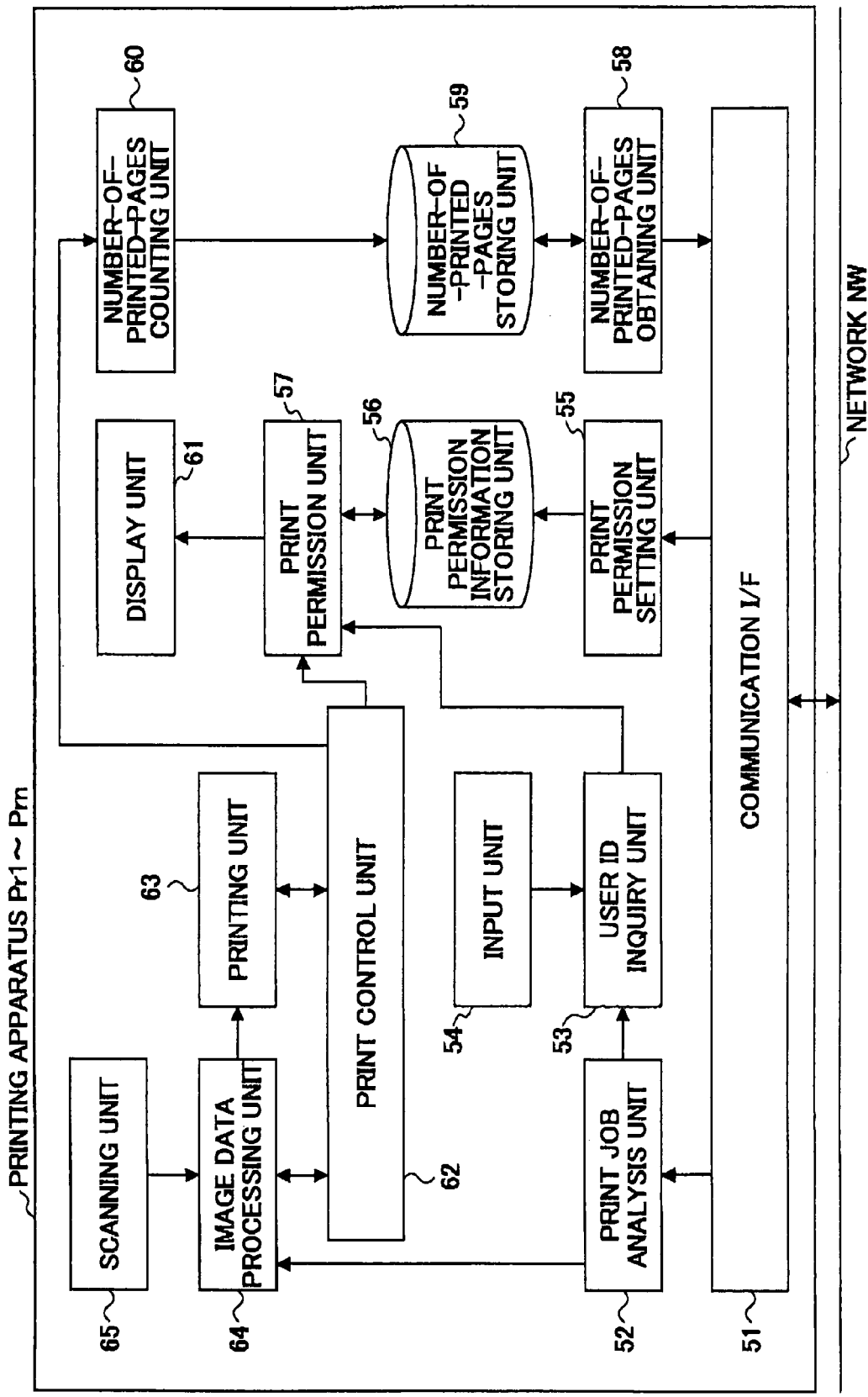
FIG. 17 is a block diagram illustrating an exemplary configuration of a printing apparatus shown in FIG. 16.

Examples of the printing apparatuses Pr1 through Prn include laser printers and multifunction printers (MFP). Each of the printing apparatuses Pr1 through Prn may include a control unit, a paper-feed unit, a printing unit (image forming unit), a paper ejecting unit, and a console display. Also, as shown in FIG. 17, each of the printing apparatuses Pr1 through Prn includes a communication I/F 51, a print job analysis unit 52, a user ID inquiry unit 53, an input unit 54, a print permission setting unit 55, a print permission information storing unit 56, a print permission unit 57, a number-of-printed-pages obtaining unit 58, a number-of-printed-pages storing unit 59, a number-of-printed-pages counting unit 60, a display unit 61, a print control unit 62, a printing unit 63, an image data processing unit 64, and a scanning unit 65. In the present application, the print permission information storing unit 56 corresponds to an image formation permission information storing unit; the number-of-printed-pages storing unit 59 corresponds to a number-of-image-formation-pages storing unit; and the print control unit 62 corresponds to an image formation control unit.

The communication I/F 51 is an interface connected to the network NW and supporting the communication protocol used in the network NW. The communication I/F 51 sends and receives information, such as print jobs and authentication information, to and from the client terminals CL1 through CLn and the management apparatus KS via the network NW.

The print job analysis unit 52 analyzes a print job received via the communication I/F 51 from any one of the client terminals CL1 through CLn, identifies image data and user authentication information such as a user ID in the print job, sends the image data to the image data processing unit 64, and sends the user authentication information to the user ID inquiry unit 53.

The input unit 54 is used to enter, for example, copy requests or print requests to the corresponding one of the printing apparatuses Pr1 through Prn and to enter user authentication information such as a user ID when copying a document.

The user ID inquiry unit 53 sends user authentication information input from the input unit 54 or user authentication information and print setting information such as a color of copy or printing sent from the print job analysis unit 52 to the print permission unit 57.

The scanning unit 65 scans a document at a specified resolution in a copying or scanning process and sends the scanned image data to the image data processing unit 64.

The image data processing unit 64 temporarily stores image data scanned by the scanning unit 65 or sent from the print job analysis unit 53 in its internal memory, processes the image data under the control of the print control unit 62, and sends the processed image data to the printing unit 63.

The printing unit 63, under the control of the print control unit 62, prints the image data sent from the image data processing unit 64 on paper by, for example, by electrophotography.

The number-of-printed-pages counting unit 60 counts the numbers of pages printed in copying and printing processes and sends the counted numbers of printed pages to the number-of-printed-pages storing unit 59.

The number-of-printed-pages storing unit (image formation pages storing unit) 59 is implemented by a non-volatile memory such as a RAM or a hard disk and stores the numbers of printed pages sent from the number-of-printed-pages counting unit 60. The number-of-printed-pages obtaining unit 58 obtains the numbers of printed pages from the number-of-printed-pages storing unit 59. More specifically, the number-of-printed-pages storing unit 59 stores the numbers of printed pages user by user, for example, in a list format. The number-of-printed-page information of each user includes, for example, a user ID, the number of black-and-white pages copied, the number of monochrome pages copied, the number of two-color pages copied, the number of full-color pages copied, the number of black-and-white pages printed, the number of monochrome pages printed, the number of two-color pages printed, and the number of full-color pages printed.

The number-of-printed-pages obtaining unit 58, when requested by the management apparatus KS via the communication I/F 51, obtains the numbers of printed pages stored in the number-of-printed-pages storing unit 59, and sends the obtained information via the communication I/F 51 and the network NW to the management apparatus KS.

The print permission setting unit 55 receives print permission information via the communication I/F 51 from the management apparatus KS and sends the received print permission information to the print permission information storing unit 56 where it is stored.

The print permission information storing unit (permission information storing unit) 56 is implemented by a non-volatile memory such as a RAM or a hard disk and stores print permission information sent from the print permission setting unit 55. The print permission unit 57 obtains the print permission information from the print permission information storing unit 56. More specifically, the print permission information storing unit 56 stores the print permission information user by user, for example, in a list format. The print permission information of each user includes, for example, a user ID, print permission for black-and-white copying (true/false), print permission for monochrome copying (true/false), print permission for two-color copying (true/false), print permission for full-color copying (true/false), print permission for black-and-white printing (true/false), print permission for monochrome printing (true/false), print permission for two-color printing (true/false), and print permission for full-color printing (true/false).

The print permission unit 57, when requested by the print control unit 62, determines whether to permit a print or copy job requested by a user based on the user authentication information sent from the user ID inquiry unit 53 and the corresponding print permission information stored in the print permission information storing unit 56. The print permission unit 57 displays a message indicating the determination result on the display unit 61 and also sends the result to the print control unit 62.

Based on the determination result, the print control unit (control unit) 62 determines whether to allow the printing unit 63 to perform the print or copy job requested by the user.

Figure 18:
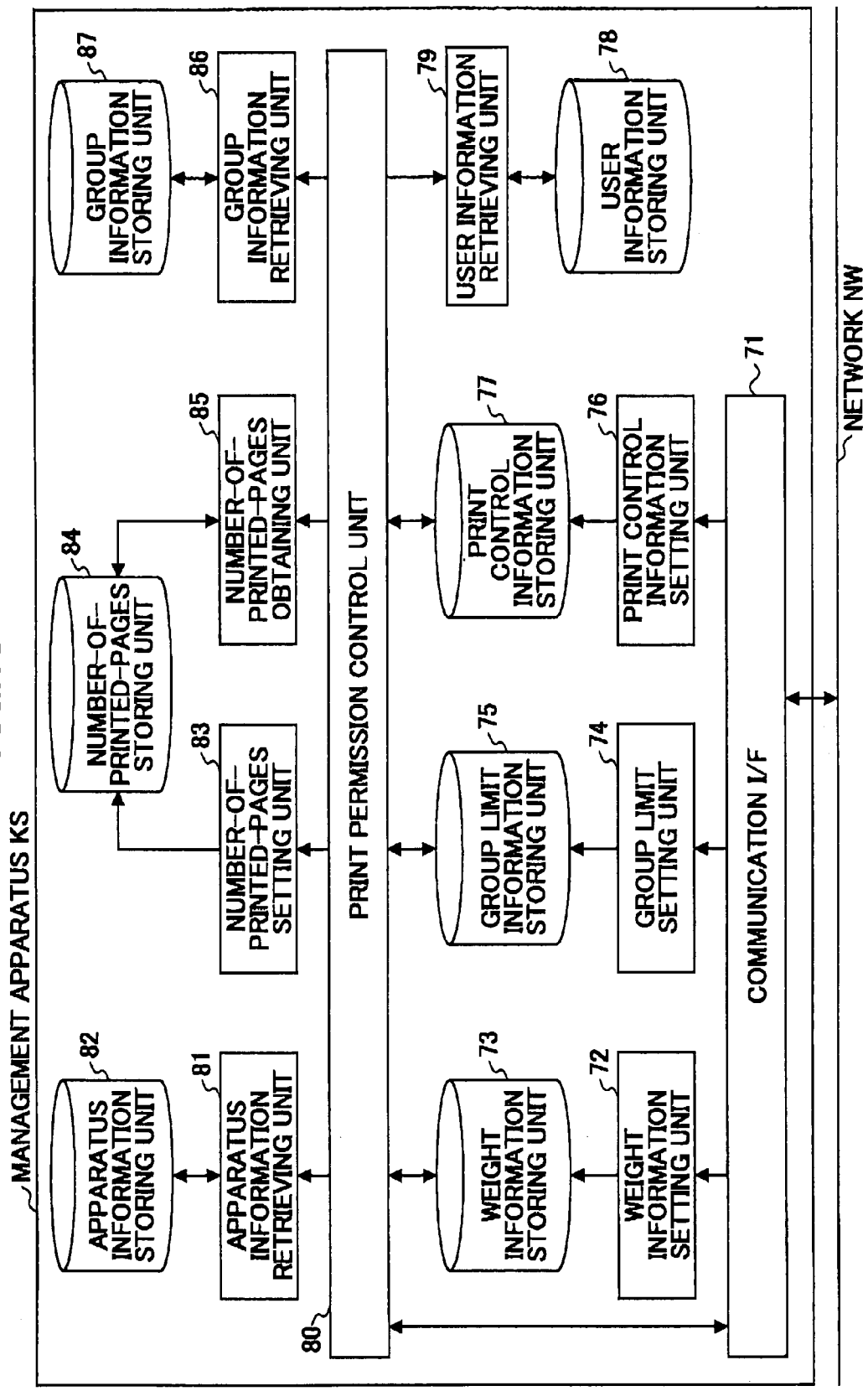
FIG. 18 is a block diagram illustrating an exemplary configuration of a management apparatus shown in FIG. 16.

FIG. 18 is a block diagram illustrating an exemplary configuration of the management apparatus KS. The management apparatus KS includes a communication I/F 71, a weight information setting unit 72, a weight information storing unit 73, a group limit setting unit 74, a group limit information storing unit 75, a print control information setting unit 76, a print control information storing unit 77, a user information retrieving unit 78, a user information storing unit 79, a print permission control unit 80, an apparatus information retrieving unit 81, an apparatus information storing unit 82, a number-of-printed-pages setting unit 83, a number-of-printed-pages storing unit (previous-number-of-printed-pages storing unit) 84, a number-of-printed-pages obtaining unit 85, a group information retrieving unit 86, and a group information storing unit 87. In the present application, the group limit information storing unit 75 corresponds to a management information storing unit, the print permission control unit 80 corresponds to a permission control unit, and the number-of-printed-pages storing unit 84 corresponds to a previous-number-of-printed-pages storing unit.

The communication I/F 71 is an interface connected to the network NW and supporting the communication protocol used in the network NW. The communication I/F 71 sends and receives data to and from the client terminals CL1 through CLn and the printing apparatuses Pr1 through Prn via the network NW.

The weight information setting unit 72, when requested by an administrator from any one of the client terminals CL1 through CLn via the network NW and the communication I/F 71, registers weight information in the weight information storing unit 73.

The weight information storing unit 73 is implemented by a non-volatile memory such as a RAM or a hard disk and stores weight information sent from the weight information setting unit 72. The print permission control unit 80 obtains the weight information from the weight information storing unit 73. More specifically, the weight information storing unit 73 stores the weight information, for example, in a list format. The weight information includes, for example, the weight of black-and-white copying, the weight of monochrome copying, the weight of two-color copying, the weight of full-color copying, the weight of black-and-white printing, the weight of monochrome printing, the weight of two-color printing, and the weight of full-color printing.

The group limit setting unit 74, when requested by an administrator from any one of the client terminals CL1 through CLn via the network NW and the communication I/F 71, registers group limit information in the group limit information storing unit 75.

The group limit information storing unit 75 is implemented by a non-volatile memory such as a RAM or a hard disk and stores group limit information sent from the group limit setting unit 74. The print permission control unit 80 obtains the group limit information from the group limit information storing unit 75. The group limit information storing unit 75 stores group limit information group by group, for example, in a list format. Group limit information of a group includes, for example, a group ID and the total maximum number of printable pages or the weighted total maximum number of printable pages.

The print control information setting unit 76, when requested by an administrator from any one of the client terminals CL1 through CLn via the network NW and the communication I/F 71, registers print control information (color modes) in the print control information storing unit 77.

The print control information storing unit 77 is implemented by a non-volatile memory such as a RAM or a hard disk and stores print control information sent from the print control information setting unit 76. The print permission control unit 80 obtains the print control information from the print control information storing unit 77. The print control information includes, for example, black-and-white copying, monochrome copying, two-color copying, full-color copying, black-and-white printing, monochrome printing, two-color printing, and full-color printing.

The user information storing unit 78 is implemented by a non-volatile memory such as a RAM or a hard disk. The user information storing unit 78 stores user information including group IDs of groups for classifying users of the client terminals CL1 through CLn that use the printing apparatuses Pr1 through Prn, and the user IDs and user names of the users in each of the groups, for example, in a list format. The user information is registered by the user information retrieving unit 79 in the user information storing unit 78 under the control of the print permission control unit 80.

Also, the user information retrieving unit 79, under the control of the print permission control unit 80, retrieves the user information stored in the user information storing unit 78 and sends the retrieved user information to the print permission control unit 80.

The apparatus information storing unit 82 is implemented by a non-volatile memory such as a RAM or a hard disk. The apparatus information storing unit 82 stores apparatus information including the group IDs and the apparatus IDs and IP addresses of the printing apparatuses Pr1 through Prn being managed by the management apparatus KS, for example, in a list format. The apparatus information is registered by the apparatus information retrieving unit 81 in the apparatus information storing unit 82 under the control of the print permission control unit 80.

Also, the apparatus information retrieving unit 81, under the control of the print permission control unit 80, retrieves the apparatus information of some of the printing apparatuses Pr1 through Prn belonging to a group specified by the print permission control unit 80 from the apparatus information storing unit 82, and sends the retrieved apparatus information to the print permission control unit 80.

The number-of-printed-pages setting unit 83 registers the number-of-printed-pages information obtained from the printing apparatuses Pr1 through Prn in the number-of-printed-pages storing unit 84 according to a request from the print permission control unit 80.

The number-of-printed-pages storing unit 84 is implemented by a non-volatile memory such as a RAM or a hard disk and stores the number-of-printed-pages information sent from the number-of-printed-pages setting unit 83 for each of the printing apparatuses Pr1 through Prn. The number-of-printed-pages obtaining unit 85 obtains the number-of-printed-pages information from the number-of-printed-pages storing unit 84. More specifically, the number-of-printed-pages storing unit 84 stores the number-of-printed-pages information printing apparatus by printing apparatus, for example, in a list format. The number-of-printed-page information of each printing apparatus includes, for example, an apparatus ID, the number of black-and-white pages copied, the number of monochrome pages copied, the number of two-color pages copied, the number of full-color pages copied, the number of black-and-white pages printed, the number of monochrome pages printed, the number of two-color pages printed, and the number of full-color pages printed.

According to a request from the print permission control unit 80, the number-of-printed-pages obtaining unit 85 obtains the number-of-printed-pages information from the number-of-printed-pages storing unit 84 and sends the obtained information to the print permission control unit 80.

The group information storing unit 87 is implemented by a non-volatile memory such as a RAM or a hard disk. The group information storing unit 87 stores group information including group IDs and names of groups for classifying users of the client terminals CL1 through CLn that use the printing apparatuses Pr1 through Prn being managed by the management apparatus KS, for example, in a list format. The group information is registered by the group information retrieving unit 86 in the group information storing unit 87 under the control of the print permission control unit 80.

Also, the group information retrieving unit 86, under the control of the print permission control unit 80, retrieves user information of users belonging to a group based on the group information stored in the group information storing unit 87, and sends the retrieved user information to the print permission control unit 80.

The print permission control unit (control unit) 80 is, for example, implemented by a central processing unit (CPU). The print permission control unit 80 is configured to periodically generate and send print permission information to the printing apparatuses Pr1 through Prn based on information obtained from the user information retrieving unit 79, the apparatus information retrieving unit 81, the group information retrieving unit 86, the weight information storing unit 73, the group limit information storing unit 75, the print control information storing unit 77, and the number-of-printed-pages obtaining unit 85, and based on the number-of-printed-pages information obtained from the printing apparatuses Pr1 through Prn.

As described above, the printing system 40 or the image formation management system of this embodiment includes the management apparatus KS and the printing apparatuses Pr1 through Prn that are connected via the network NW. The functions of the management apparatus KS and the printing apparatuses Pr1 through Prn may be implemented by image formation management programs stored in a recording medium such as a compact disc (CD), a compact disc rewritable (CD-RW), a digital versatile disc (DVD), or a flexible disk.

Next, operations of the printing system 40 of this embodiment are described. In the printing system 40 of this embodiment, the users of the client terminals CL1 through CLn that use the printing apparatuses Pr1 through Prn are managed by groups. This configuration makes it possible to limit printing on the printing apparatuses Pr1 through Prn group by group and user by user.

Figure 19:
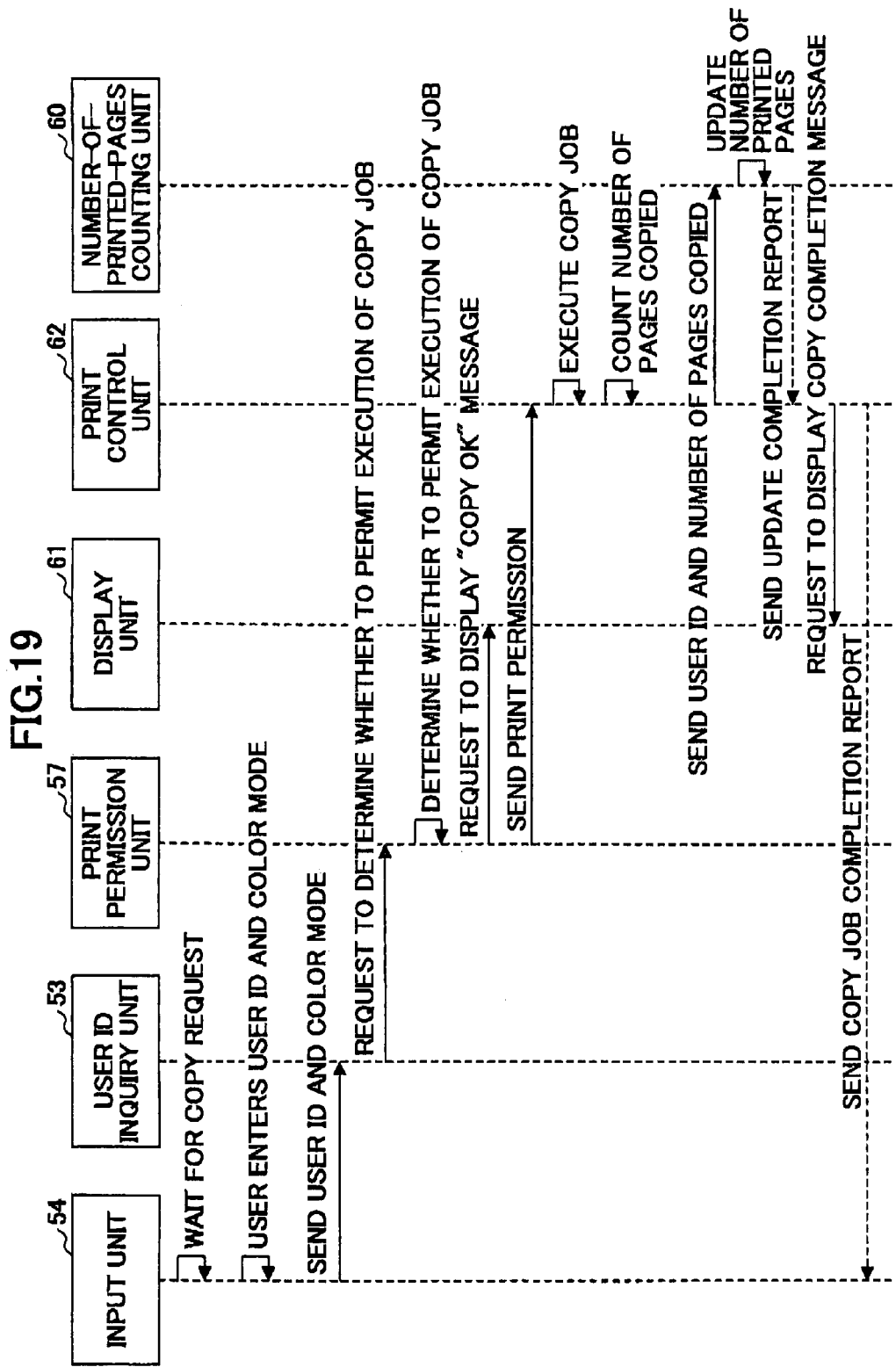
FIG. 19 is a sequence chart showing an exemplary copy management process by a printing apparatus of FIG. 17, in which exemplary process copying is permitted.

FIG. 19 is a sequence chart showing an exemplary copy management process in the printing system 40, in which exemplary process copying is permitted.

Take, for example, a case where a user tries to make a photocopy of a document on the printing apparatus Pr1. When the user sets a document on the scanning unit 65 of the printing apparatus Pr1, the input unit 54 enters an input wait state. When the user enters the user ID and a color mode (such as black-and-white, monochrome, etc.) from the input unit 54, the input unit 54 sends the user ID and the color mode to the user ID inquiry unit 53.

The user ID inquiry unit 53 requests the print permission unit 57 to determine whether to permit the execution of the copy job of the user based on the user ID, the color mode (print control information), and the corresponding print permission information stored in the print permission information storing unit 56. In this exemplary process, it is assumed that the print permission information in the print permission information storing unit 56 corresponding to the user ID and the color mode is set to true. Therefore, the print permission unit 57 displays a message ("Copy OK") indicating that the execution of the copy job has been permitted on the display unit 61. Also, the print permission unit 57 sends a print permission to the print control unit 62.

When receiving the print permission, the print control unit 62 causes the scanning unit 65 to scan the document and send the scanned image data to the image data processing unit 64 where the image data are temporarily stored and processed. After the processing by the image data processing unit 64, the print control unit 62 sends the processed image data to the printing unit 63 and causes the printing unit 63 to print the image data on paper.

The print control unit 62 performs this process for each of the pages of the document and counts the number of pages copied in the copy job. After completing the copy job, the print control unit 62 sends the user ID and the number of pages copied in the copy job to the number-of-printed-pages counting unit 60. Then, the number-of-printed-pages counting unit 60 updates the number of printed pages corresponding to the user ID in the number-of-printed-pages storing unit 59 by adding the number of pages copied in the copy job, and sends an update completion report to the print control unit 62.

When receiving the update completion report from the number-of-printed-pages counting unit 60, the print control unit 62 displays a message indicating the completion of the copy job on the display unit 61, sends a copy job completion report to the input unit 54, and terminates the copy management process.

Figure 20:
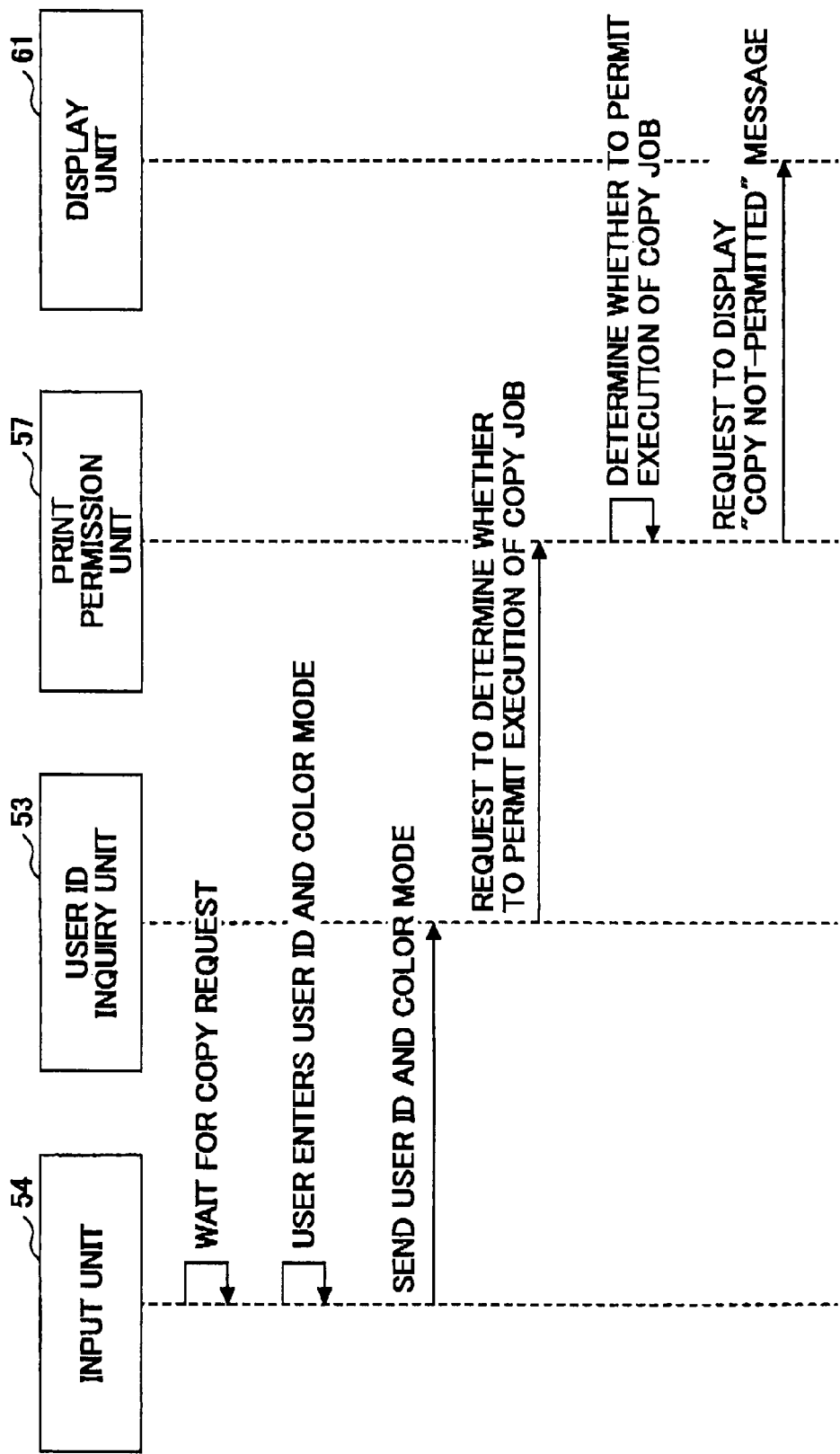
FIG. 20 is a sequence chart showing an exemplary copy management process by a printing apparatus of FIG. 17, in which exemplary process copying is not permitted.

FIG. 20 is a sequence chart showing an exemplary copy management process in the printing system 40, in which exemplary process copying is not permitted.

Take, for example, a case where a user tries to make a photocopy of a document on the printing apparatus Pr1. When the user sets a document on the scanning unit 65 of the printing apparatus Pr1, the input unit 54 enters an input wait state. When the user enters the user ID and the color mode (such as black-and-white, monochrome, etc.) from the input unit 54, the input unit 54 sends the user ID and the color mode to the user ID inquiry unit 53.

The user ID inquiry unit 53 requests the print permission unit 57 to determine whether to permit the execution of the copy job of the user based on the user ID, the color mode, and the corresponding print permission information stored in the print permission information storing unit 56. In this exemplary process, it is assumed that the print permission information in the print permission information storing unit 56 corresponding to the user ID and the color mode is set to false. Therefore, the print permission unit 57 displays a message ("Copy Not-Permitted") indicating that the execution of the copy job has been denied on the display unit 61, and terminates the copy management process.

Figure 21:
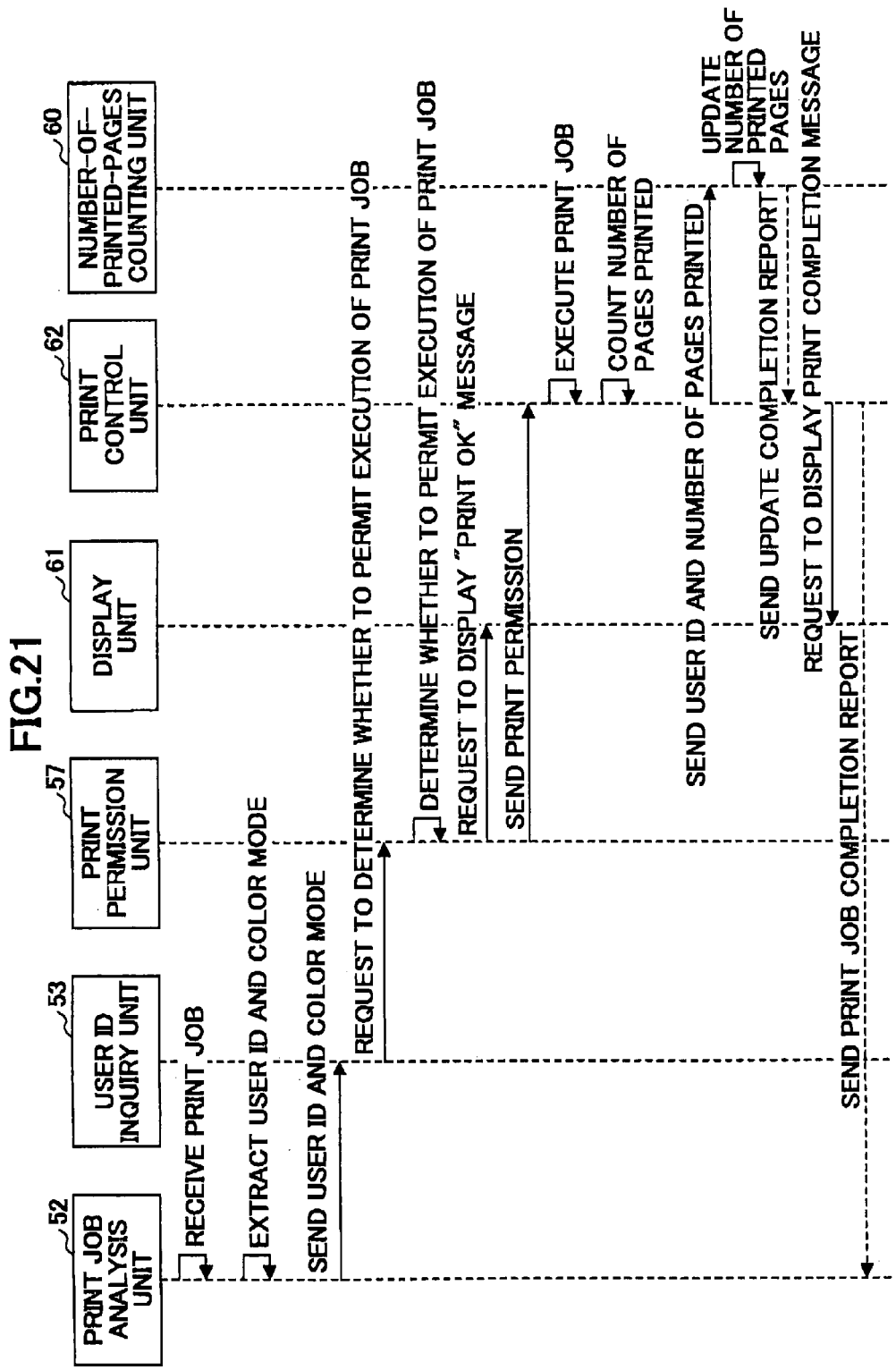
FIG. 21 is a sequence chart showing an exemplary print management process by a printing apparatus of FIG. 17, in which exemplary process printing is permitted.

FIG. 21 is a sequence chart showing an exemplary print management process in the printing system 40, in which exemplary process printing is not permitted.

Take, for example, a case where a user tries to print a document from the client terminal CL1 on the printing apparatus Pr1. The user sends a print job including the user ID, print data, and print control information (color mode) from the client terminal CL1 to the printing apparatus Pr1. When the communication I/F 51 of the printing apparatus Pr1 receives the print job, the print job analysis unit 52 extracts the user ID and the color mode from the print job and sends them to the user ID inquiry unit 53.

The user ID inquiry unit 53 requests the print permission unit 57 to determine whether to permit the execution of the print job of the user based on the user ID, the color mode, and the corresponding print permission information stored in the print permission information storing unit 56. In this exemplary process, it is assumed that the print permission information in the print permission information storing unit 56 corresponding to the user ID and the color mode is set to true. Therefore, the print permission unit 57 displays a message ("Print OK") indicating that the execution of the print job has been permitted on the display unit 61. Also, the print permission unit 57 sends a print permission to the print control unit 62.

When receiving the print permission, the print control unit 62 causes the print job analysis unit 52 to send the image data in the print job to the image data processing unit 64 where the image data are temporarily stored and processed. After the processing by the image data processing unit 64, the print control unit 62 sends the processed image data to the printing unit 63 and causes the printing unit 63 to print the image data on paper.

The print control unit 62 performs this process for each of the pages of the document and counts the number of pages printed in the print job. After completing the print job, the print control unit 62 sends the user ID and the number of pages printed in the print job to the number-of-printed-pages counting unit 60. Then, the number-of-printed-pages counting unit 60 updates the number of printed pages corresponding to the user ID in the number-of-printed-pages storing unit 59 by adding the number of pages printed in the print job, and sends an update completion report to the print control unit 62.

When receiving the update completion report from the number-of-printed-pages counting unit 60, the print control unit 62 displays a message indicating the completion of the print job on the display unit 61, sends a print job completion report to the print job analysis unit 52, and terminates the print management process.

Figure 22:
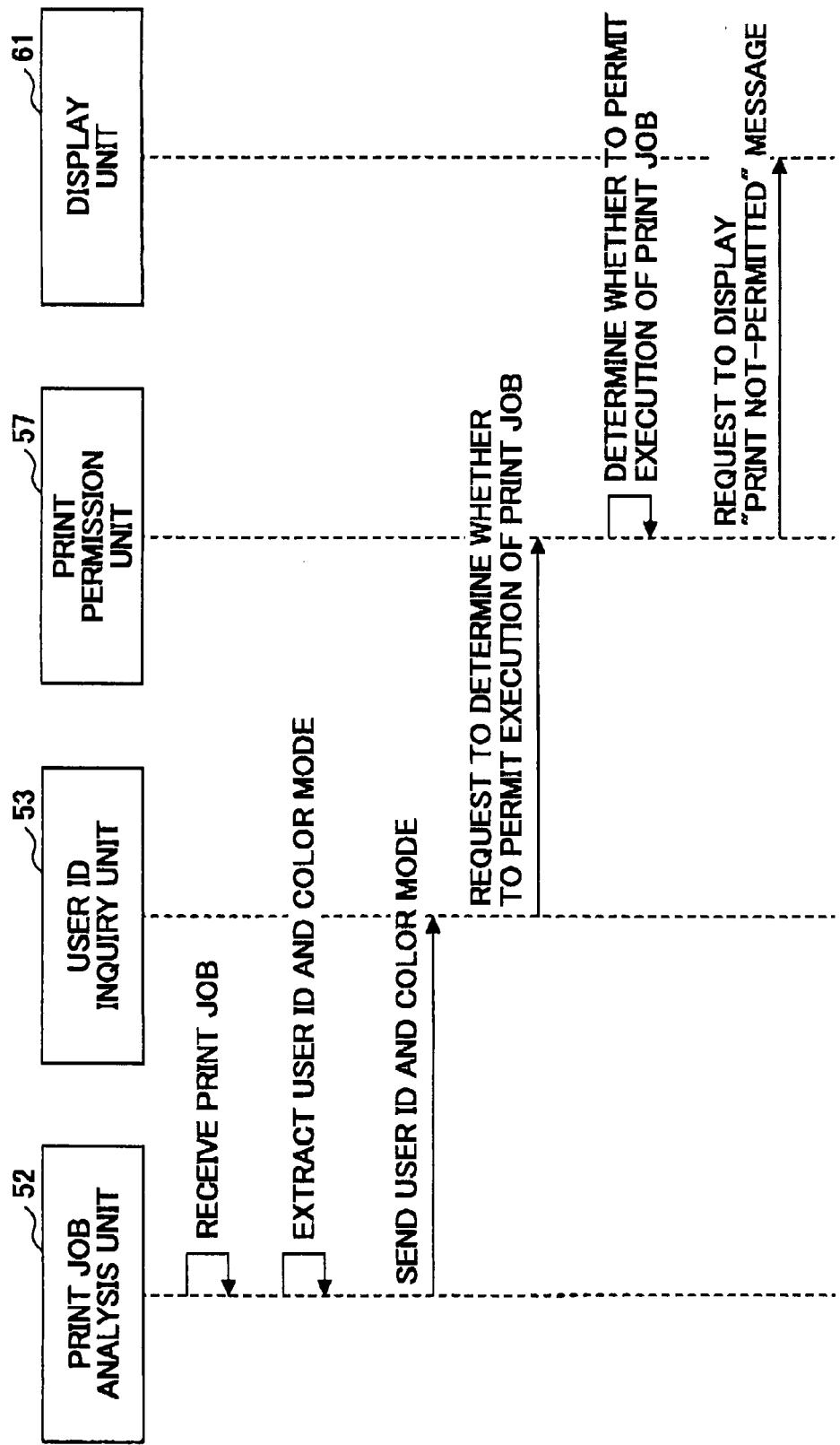
FIG. 22 is a sequence chart showing an exemplary print management process by a printing apparatus of FIG. 17, in which exemplary process printing is not permitted.

FIG. 22 is a sequence chart showing an exemplary print management process in the printing system 40, in which exemplary process printing is not permitted.

Take, for example, a case where a user tries to print a document from the client terminal CL1 on the printing apparatus Pr1. The user sends a print job including the user ID, print data, and print control information (color mode) from the client terminal CL1 to the printing apparatus Pr1. When the communication I/F 51 of the printing apparatus Pr1 receives the print job, the print job analysis unit 52 extracts the user ID and the color mode from the print job and sends them to the user ID inquiry unit 53.

The user ID inquiry unit 53 requests the print permission unit 57 to determine whether to permit the execution of the print job of the user based on the user ID, the color mode, and the corresponding print permission information stored in the print permission information storing unit 56. In this exemplary process, it is assumed that the print permission information in the print permission information storing unit 56 corresponding to the user ID and the color mode is set to false. Therefore, the print permission determining unit 57 displays a message ("Print Not-Permitted") indicating that the execution of the print job has been denied on the display unit 61, and terminates the print management process.

The print job analysis unit 52 may be configured to send a message that the execution of the print job has been denied via the communication I/F 51 to the client terminal CL1 to inform the result to the user.

An exemplary print permission management process by the management apparatus KS is described below with reference to FIGS. 23 and 24.

Figure 23:
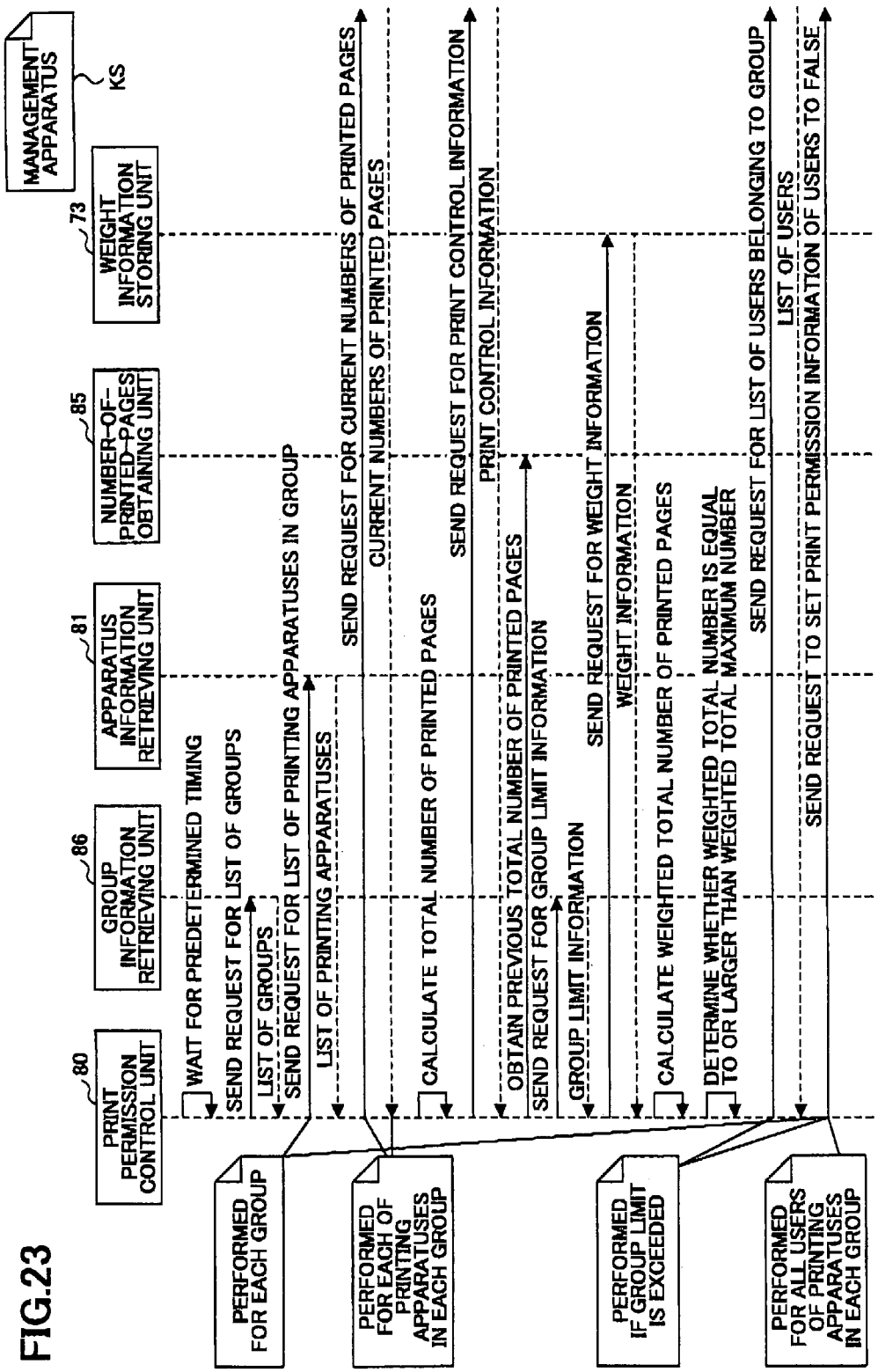
FIG. 23 is a sequence chart showing an exemplary print permission management process by a management apparatus of FIG. 18.

As shown in FIG. 23, the print permission control unit 80 of the management apparatus KS waits for a predetermined timing for performing a print permission management process. At the predetermined timing, the print permission control unit 80 sends a request for a list of groups to the group information retrieving unit 86. When receiving the request, the group information retrieving unit 86 retrieves the list of groups from the group information storing unit 87 and sends the obtained list of groups to the print permission control unit 80. For example, the print permission control unit 80 may be configured to perform the print permission management process at regular intervals.

Based on the list of groups, the print permission control unit 80 performs the steps described below for each of the groups. In the descriptions below, a group A is taken as an example and it is assumed that the printing apparatuses Pr1 through Pr3 belong to the group A. The print permission control unit 80 requests the apparatus information retrieving unit 81 to obtain the list of printing apparatuses belonging to the group A. When requested, the apparatus information retrieving unit 81 obtains the list of printing apparatuses (the printing apparatuses Pr1 through Pr3) belonging to the group A from the apparatus information storing unit 82 and sends the list to the print permission control unit 80.

The print permission control unit 80 sends a request for the current numbers of printed pages to each of the printing apparatuses Pr1 through Pr3 belonging to the group A via the network NW. When receiving the request, as shown in FIG. 24, the number-of-printed-pages obtaining unit 58 of each of the printing apparatuses Pr1 through Pr3 obtains the current numbers of printed pages from the number-of-printed-pages storing unit 59 and sends the obtained current numbers of printed pages via the network NW to the management apparatus KS.

After receiving the current numbers of printed pages from all of the printing apparatuses Pr1 through Pr3, the print permission control unit 80 obtains a total number of printed pages by adding up the current numbers of printed pages. Then, the print permission control unit 80 obtains the print control information from the print control information storing unit 77.

Next, as shown in FIG. 23, the print permission control unit 80 sends a request for the previous total number of printed pages of the group A to the number-of-printed-pages obtaining unit 85. The number-of-printed-pages obtaining unit 85 obtains the previous total number of printed pages of the group A from the number-of-printed-pages storing unit 84 and sends it to the print permission control unit 80.

Also, the print permission control unit 80 sends a request for the group limit information of the group A to the group information retrieving unit 86. The group information retrieving unit 86 obtains the group limit information from the group limit information storing unit 75 and sends it to the print permission control unit 80.

Further, the print permission control unit 80 obtains the weight information from the weight information storing unit 73. Then, the print permission control unit 80 calculates a weighted total number of printed pages based on the total number of printed pages, the previous total number of printed pages, the print control information, and the weight information, and determines whether the weighted total number of printed pages is equal to or larger than the weighted total maximum number of printable pages in the group limit information.

Figure 24:
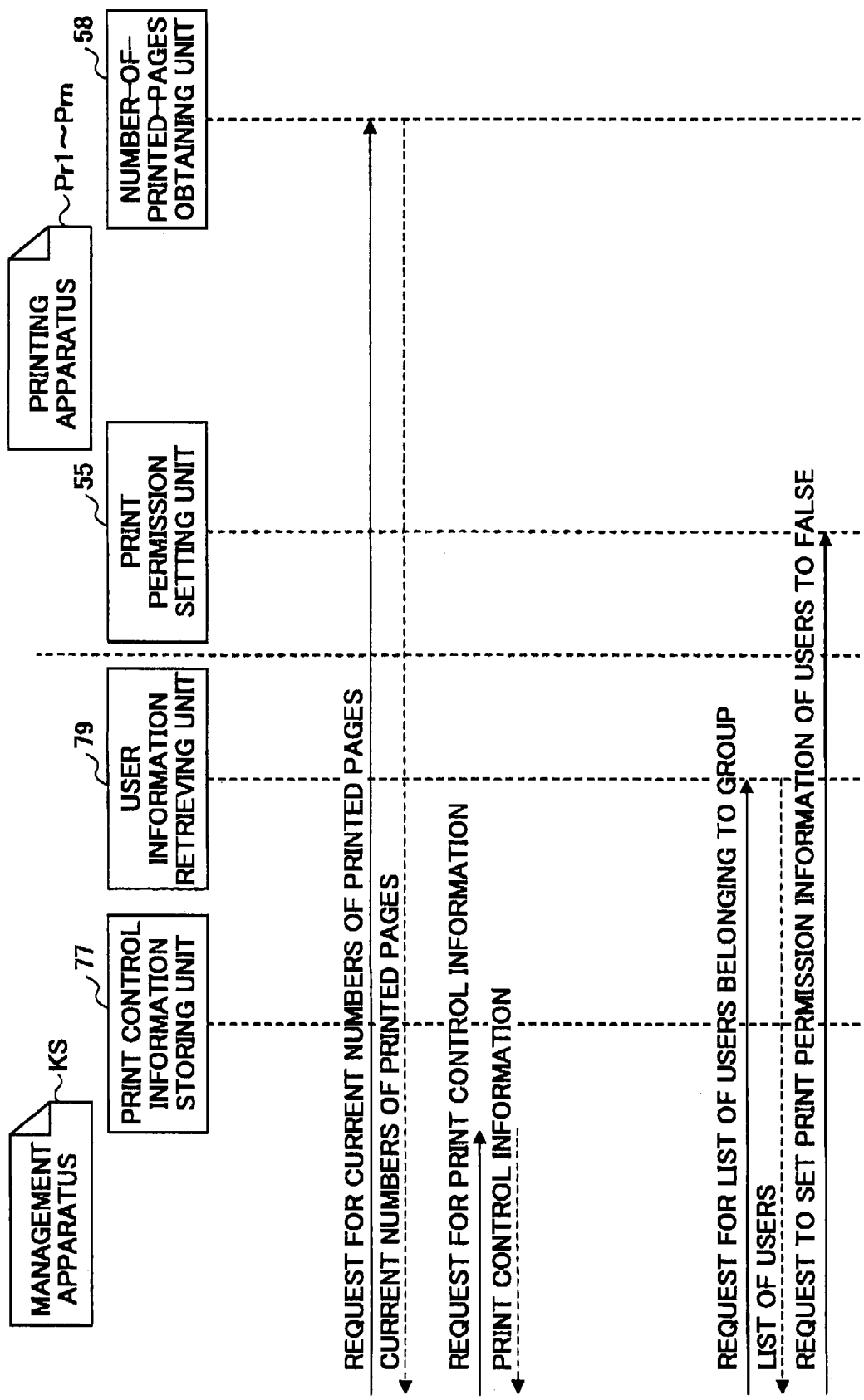
FIG. 24 is a sequence chart showing remaining steps of the exemplary print permission management process shown in FIG. 23.

If the weighted total number of printed pages is equal to or larger than the weighted total maximum number of printable pages, as shown in FIG. 24, the print permission control unit 80 sends a request for a list of users belonging to the group A to the user information retrieving unit 79. The user information retrieving unit 79 obtains the list of users belonging to the group A from the user information storing unit 78 and sends the list to the print permission control unit 80.

After receiving the list of users, the print permission control unit 80 requests, via the network NW, the printing apparatuses Pr1 through Pr3 belonging to the group A to set the print permission information of the users in the list to false.

When receiving the request from the print permission control unit 80, the print permission setting unit 55 of each of the printing apparatuses Pr1 through Pr3 sets the print permission information, which is stored in the print permission information storing unit 56, of the corresponding users to false.

After performing the above steps for all the groups, the print permission control unit 80 terminates the print permission management process.

Thus, in the printing system 40 of this embodiment, the printing apparatuses Pr1 through Prn count the current numbers of printed pages (current numbers of image formation pages) of users. The management apparatus KS periodically obtains the current numbers of printed pages of the users from the printing apparatuses Pr1 through Prn, calculates the total number of printed pages (total number of image formation pages) for each group of users, and determines whether the total number of printed pages is equal to or larger than the total maximum number of printable pages (total maximum number of image formation pages) assigned to the group. If the total number of printed pages is equal to or larger than the total maximum number of printable pages, the management apparatus KS requests the printing apparatuses Pr1 through Prn to set the print permission information of the corresponding users to false. The printing apparatuses Pr1 through Prn limit printing or copying by the users according to the print permission information.

This configuration makes it possible to limit the use of the printing apparatuses Pr1 through Prn group by group and user by user without reducing the response speed of the printing system 40.

Also, in the printing system 40 of this embodiment, print permission information of users of the printing apparatuses Pr1 through Prn can be managed group by group by one management apparatus KS. This configuration makes it possible to reduce the cost of managing the printing apparatuses Pr1 through Prn. Also, each of the printing apparatuses Pr1 through Prn of the printing system 40 of this embodiment may include copy, print, and facsimile functions and may be configured to limit its use function by function. In this case, each of the printing apparatuses Pr1 through Prn may be configured to count the number of printed pages for each user function by function. The management apparatus KS may be configured to calculate the total number of printed pages for each group and function, to determine the print permission for each group and function based on the total number of printed pages and the total maximum number of printable pages stored in the group limit information storing unit 75 for each group and function, and to request the printing apparatuses Pr1 through Prn to set the print permission information of users group by group for each function. This configuration makes it possible to limit the use of the printing apparatuses Pr1 through Prn function by function and thereby to perform print management effectively.

Also, the printing system 40 of this embodiment may be configured to limit the use of the printing apparatuses Pr1 through Prn for each color mode. In this case, the management apparatus KS is configured to store print control information (color modes; e.g. black-and-white, monochrome, etc.) in the print control information storing unit 77, to store weight information including weights of the color modes in the weight information storing unit 73, to calculate the weighted total number of printed pages for each of the color modes, to determine whether the weighted total number of printed pages is equal to or larger than the weighted total maximum number of printable pages assigned to each color mode, and to request the printing apparatuses Pr1 through Prn to set the print permission information for each color mode according to the determination results.

This configuration makes it possible to limit the use of printing apparatuses for each of the color modes and thereby to perform print management effectively.

In the above configuration, the management apparatus KS calculates the weighted total number of printed pages for each color mode by multiplying the total number of printed pages of a color mode and the weight of the color mode. For example, when the number of black-and-white pages copied is 15 and the weight of black-and-white copying is 1, the weighted total number of printed pages for the black-and-white copying becomes 15 (=15×1). Similarly, when the number of full-color pages copied is 5 and the weight of full-color copying is 4, the weighted total number of printed pages for the full-color copying becomes 20 (=5×4). With the weights of color modes determined according to their relative costs, it is possible to limit the use of the printing apparatuses Pr1 through Prn based on their running costs.

In other words, the above configuration makes it possible to effectively limit the number of pages printable by users taking into account the use patterns and the running costs of printing apparatuses.

The management apparatus KS of the printing system 40 of this embodiment may be configured to store the weight information for each group ID in the weight information storing unit 73 and to calculate the weighted total number of printed pages for each group.

This configuration makes it possible to limit the number of printable pages group by group taking into account the use patterns of printing apparatuses by the groups.

The management apparatus KS of the printing system 40 of this embodiment may be configured to store the weight information for each user ID in the weight information storing unit 73 and to calculate the weighted total number of printed pages for each user.

This configuration makes it possible to limit the number of printable pages user by user taking into account the use patterns of printing apparatuses by the users. For example, this configuration makes it possible to limit the number of printable pages for general staff and not to limit the number of printable pages for managers.

In the print permission management process described above, the management apparatus KS manages the print permission information of the printing apparatuses Pr1 through Prn group by group. Alternatively, the print permission management process may be performed for selected ones of the printing apparatuses Pr1 through Prn.

For example, it is possible to select some of the printing apparatuses Pr1 through Prn that are heavily used and to perform the print permission management process for the selected ones of the printing apparatuses Pr1 through Prn. This method makes it possible to efficiently and effectively limit the use of the printing apparatuses Pr1 through Prn.

In the print permission management process described above, the management apparatus KS calculates the weighted total number of printed pages from the numbers of printed pages of all users, groups, and color modes. Alternatively, the management apparatus KS may be configured to calculate a weighted number of printed pages only from the numbers of printed pages of users, groups, and color modes the print permission information of each of which is set to true, and to obtain the weighted total number of printed pages by adding the calculated weighted number of printed pages and the previous weighted total number of printed pages.

This configuration makes it possible to more efficiently perform the print permission management process.

Also, the management apparatus KS may be configured to obtain the previous numbers of printed pages from the number-of-printed-pages obtaining unit 85, to calculate the differences between the previous numbers of printed pages and the current numbers of printed pages obtained from the printing apparatuses Pr1 through Prn, and to calculate the total number of printed pages or the weighted total number of printed pages based on the differences.

This configuration makes it possible to correctly monitor the usage of the printing apparatuses Pr1 through Prn and thereby to appropriately limit the use of the printing apparatuses Pr1 through Prn.

An exemplary number-of-printed-pages resetting process by the management apparatus KS is described below with reference to FIGS. 25 and 26.

Figure 25:
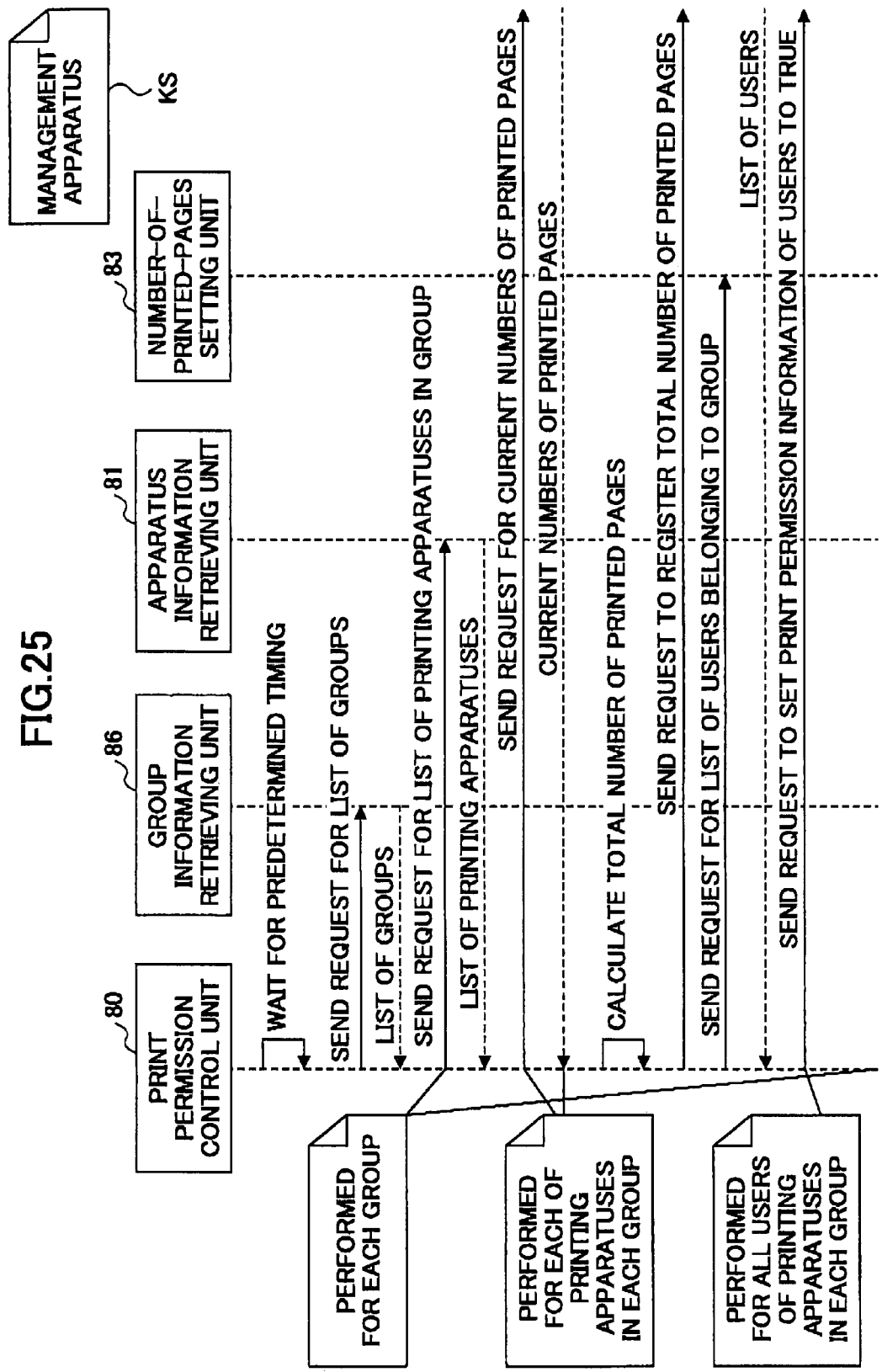
FIG. 25 is a sequence chart showing an exemplary number-of-printed-pages resetting process by a management apparatus of FIG. 18.

As shown in FIG. 25, the print permission control unit 80 of the management apparatus KS sends a request for a list of groups, for example, at the beginning of every month, to the group information retrieving unit 86. When receiving the request, the group information retrieving unit 86 obtains the list of groups from the group information storing unit 87 and sends the list to the print permission control unit 80.

Based on the list of groups, the print permission control unit 80 performs the steps described below for each group. In the descriptions below, a group A is taken as an example and it is assumed that the printing apparatuses Pr1 through Pr3 belong to the group A. The print permission control unit 80 requests the apparatus information retrieving unit 81 to obtain the list of printing apparatuses belonging to the group A. When requested, the apparatus information retrieving unit 81 obtains the list of printing apparatuses (the printing apparatuses Pr1 through Pr3) belonging to the group A from the apparatus information storing unit 82 and sends the list to the print permission control unit 80.

The print permission control unit 80 sends a request for the current numbers of printed pages to each of the printing apparatuses Pr1 through Pr3 belonging to the group A via the network NW. When receiving the request, as shown in FIG.

26, the number-of-printed-pages obtaining unit 58 of each of the printing apparatuses Pr1 through Pr3 obtains the current numbers of printed pages from the number-of-printed-pages storing unit 59 and sends the obtained current numbers of printed pages via the network NW to the management apparatus KS.

After receiving the current numbers of printed pages from all of the printing apparatuses Pr1 through Pr3, the print permission control unit 80 obtains a total number of printed pages by adding up the numbers of printed pages. Then, as shown in FIG. 26, the print permission control unit 80 requests the number-of-printed-pages setting unit 83 to register the total number of printed pages in the number-of-printed-pages storing unit 84.

When requested, the number-of-printed-pages setting unit 83 registers the total number of printed pages in the number-of-printed-pages storing unit 84. The total number of printed pages registered in the number-of-printed-pages storing unit 84 is used in the next print permission management process as described above.

Then, the print permission control unit 80 sends a request for a list of users belonging to the group A to the user information retrieving unit 79. The user information retrieving unit 79 obtains the list of users belonging to the group A from the user information storing unit 78 and sends the list to the print permission control unit 80.

After receiving the list of users, the print permission control unit 80 requests, via the network NW, the printing apparatuses Pr1 through Pr3 belonging to the group A to set the print permission information of the users in the list to true.

When receiving the request from the print permission control unit 80, the print permission setting unit 55 of each of the printing apparatuses Pr1 through Pr3 sets the print permission information, which is stored in the print permission information storing unit 56, of the corresponding users to true. This process resets the print permission information of users to true and allows them to print or copy documents again.

After performing the above steps for all the groups, the print permission control unit 80 terminates the number-of-printed-pages resetting process.

As described above, in the printing system 40 of this embodiment, if the total number of printed pages of a group exceeds the total maximum number of printable pages assigned to the group, all the users belonging to the group become unable to print or copy documents on the corresponding printing apparatuses. Therefore, it is necessary to perform the number-of-printed-pages resetting process periodically. Configuring the management apparatus KS to automatically perform the number-of-printed-pages resetting process at regular intervals, for example, at the beginning or end of every month, makes it possible to reduce the work load of an administrator.

The total maximum numbers of printable pages for respective groups may be entered directly from an input unit (e.g. a keyboard) of the management apparatus KS or sent from any one of the client terminals CL1 through CLn to the management apparatus KS.

This configuration makes it possible to set an appropriate maximum number of printable pages for each group taking into account the usage of the printing apparatuses by the group.

Embodiments of the present invention provide an image formation management system, an image formation management method, and a storage medium containing an image formation management program that make it possible to effectively limit the use of image forming apparatuses user by user or group by group without sacrificing the response speed of a printing system.

An image formation system according to an embodiment of the present invention includes a management apparatus and image forming apparatuses that are connected to each other via a network. The management apparatus provides user information of users to image forming apparatuses used by the users, and sets the maximum numbers of image formation pages of the users in the image forming apparatuses. The image forming apparatuses authenticate the users based on the user information, and limit image formation by the authenticated users based on the current numbers of image formation pages and the maximum numbers of image formation pages. Also, the management apparatus accesses the image forming apparatuses at predetermined timings to obtain the current numbers of image formation pages of the users, calculate the current sub-total numbers of image formation pages from the obtained current numbers of image formation pages, calculate the maximum numbers of image formation pages from the current sub-total numbers of image formation pages and the sub-total maximum numbers of image formation pages stored in the management apparatus, and send the calculated maximum numbers of image formation pages to the image forming apparatuses. When a user sends an image formation job to an image forming apparatus, the image forming apparatus authenticates the user based on the user information, and determines whether to permit the execution of the image formation job based on the current number of image formation pages and the maximum number of image formation pages of the user. This configuration makes it possible to perform an image formation management process without reducing the response speed of the image formation system and, at the same time, makes it possible to reduce the work load of the image forming apparatuses.

An image formation system according to another embodiment of the present invention includes a management apparatus and image forming apparatuses that are connected to each other via a network. The image forming apparatuses count the current numbers of image formation pages of users. The management apparatus periodically obtains the current numbers of image formation pages of the users from the image forming apparatuses, calculates the total number of image formation pages for each group of users from the obtained current numbers of image formation pages, and determines whether the total number of image formation pages is equal to or larger than the total maximum number of image formation pages assigned to the group. If the total number of image formation pages is equal to or larger than the total maximum number of image formation pages, the management apparatus requests the image forming apparatuses to set the image formation permission information of the corresponding users to false. The image forming apparatuses limit image formation by the users according to the image formation permission information. This configuration makes it possible to effectively limit the use of the image forming apparatuses group by group and user by user without reducing the response speed of the image formation system.

The present invention is not limited to the specifically disclosed embodiments, and variations and modifications may be made without departing from the scope of the present invention.

The present application is based on Japanese Priority Application No. 2006-273608 filed on Oct. 5, 2006, and Japanese Priority Application No. 2006-329079 filed on Dec. 6, 2006, the entire contents of which are hereby incorporated herein by reference.

What is claimed is:

1. An image formation management system, comprising:
image forming apparatuses for forming images according to image formation jobs; and
a management apparatus connected via a network to the image forming apparatuses and configured to manage the use of the image forming apparatuses; wherein
each of the image forming apparatuses includes
a number-of-image-formation-pages storing unit configured to store current numbers of image formation pages of users of the each of the image forming apparatuses,
an image formation permission information storing unit configured to store image formation permission information of the users, and
an image formation control unit configured to determine whether to allow the users to perform image formation based on the image formation permission information, to count numbers of image formation pages of the allowed users, and to update the current numbers of image formation pages in the number-of-image-formation-pages storing unit based on the counted numbers of image formation pages; and
the management apparatus includes
a management information storing unit configured to store a total maximum number of image formation pages for each of groups to which the users belong, and
a permission control unit configured to obtain the current numbers of image formation pages of the users belonging to the each of the groups from the image forming apparatuses at predetermined timings, to calculate a total number of image formation pages of the each of the groups by adding up the current numbers of image formation pages, to determine whether the total number of image formation pages is equal to or larger than the total maximum number of image formation pages, and to request the image forming apparatuses to set the image formation permission information of the users belonging to the each of the groups to false if the total number of image formation pages is equal to or larger than the total maximum number of image formation pages;
wherein the image formation control unit of each of the image forming apparatuses is configured to set the image formation permission information of the corresponding users in the image formation permission information storing unit to false when requested by the permission control unit.

2. The image formation management system as claimed in claim 1, wherein
each of the image forming apparatuses includes a copy function, a print function, and a facsimile function;
the image formation permission information storing unit is configured to store the image formation permission information for each of the users and the functions;
the image formation control unit is configured to determine whether to allow the users to use the functions based on the image formation permission information, to count the numbers of image formation pages of the allowed users for each of the functions, and to update the current numbers of image formation pages in the number-of-image-formation-pages storing unit based on the counted numbers of image formation pages;
the management information storing unit is configured to store the total maximum number of image formation pages for each of the groups and the functions; and
the permission control unit is configured to calculate the total number of image formation pages for each of the groups and the functions, to determine whether the total number of image formation pages is equal to or larger than the total maximum number of image formation pages for each of the groups and the functions, and to request the image forming apparatuses to set the corresponding image formation permission information of the users belonging to the each of the groups to false if the total number of image formation pages is equal to or larger than the total maximum number of image formation pages.

3. The image formation management system as claimed in claim 1, wherein
each of the image forming apparatuses is configured to perform image formation in multiple color modes;
the image formation permission information storing unit is configured to store the image formation permission information for each of the users and the color modes;
the image formation control unit is configured to limit image formation by the users for each of the color modes based on the image formation permission information, to count the numbers of image formation pages of the users for each of the color modes, and to update the current numbers of image formation pages in the number-of-image-formation-pages storing unit based on the counted numbers of image formation pages;
the management information storing unit is configured to store the total maximum number of image formation pages for each of the groups and the color modes; and
the permission control unit is configured to calculate the total number of image formation pages for each of the groups and the color modes, to determine whether the total number of image formation pages is equal to or larger than the total maximum number of image formation pages for each of the groups and the color modes, and to request the image forming apparatuses to set the corresponding image formation permission information of the users belonging to the each of the groups to false if the total number of image formation pages is equal to or larger than the total maximum number of image formation pages.

4. The image formation management system as claimed in claim 3, wherein
the management apparatus further includes a weight information storing unit configured to store weights of the color modes;
the management information storing unit is configured to store a weighted total maximum number of image formation pages for each of the groups and the color modes;
the permission control unit is configured to calculate a weighted total number of image formation pages for each of the groups and the color modes by multiplying the total number of image formation pages and the corresponding one of the weights, to determine whether the weighted total number of image formation pages is equal to or larger than the weighted total maximum number of image formation pages for each of the groups and the color modes, and to request the image forming apparatuses to set the corresponding image formation permission information of the users belonging to the each of the groups to false if the weighted total number of image formation pages is equal to or larger than the weighted total maximum number of image formation pages.

5. The image formation management system as claimed in claim 4, wherein the weight information storing unit is configured to store the weights of the color modes for each of the groups.

6. The image formation management system as claimed in claim 4, wherein the weight information storing unit is configured to store the weights of the color modes for each of the users; and the permission control unit is configured to obtain the current numbers of image formation pages from the image forming apparatuses for each of the users and the color modes, to calculate a sub-total number of image formation pages for the each of the users and the color modes by adding up the obtained current numbers of image formation pages, to calculate a weighted number of image formation pages for the each of the users and the color modes by multiplying the sub-total number of image formation pages and the corresponding one of the weights, and to calculate the weighted total number of image formation pages for each of the groups and the color modes by adding up the weighted numbers of image formation pages of the users belonging to the each of the groups.

7. The image formation management system as claimed in claim 1, wherein the management apparatus further includes a previous-number-of-image-formation-pages storing unit configured to store the current numbers of image formation pages obtained from the image forming apparatuses; and the permission control unit is configured to calculate the total number of image formation pages based on a difference between the current numbers of image formation pages newly obtained from the image forming apparatuses and the current numbers of image formation pages previously obtained and stored in the previous-number-of-image-formation-pages storing unit.

8. The image formation management system as claimed in claim 1, wherein the management apparatus further includes a previous-number-of-image-formation-pages storing unit configured to store the current numbers of image formation pages obtained from the image forming apparatuses; and the permission control unit is configured to obtain the current numbers of image formation pages from the image forming apparatuses at scheduled timings, to store the obtained current numbers of image formation pages in the previous-number-of-image-formation-pages storing unit, to identify the users whose image formation permission information is set to false, and to request the image forming apparatuses to reset the image formation permission information of the identified users to true.

9. The image formation management system as claimed in claim 1, wherein the management apparatus further includes an input unit to enter the total maximum number of image formation pages.

\* \* \* \* \*